United States Patent
Lam et al.

(10) Patent No.: US 7,849,267 B2
(45) Date of Patent: Dec. 7, 2010

(54) NETWORK-EXTENDED STORAGE

(75) Inventors: Monica Sin-Ling Lam, Menlo Park, CA (US); Kelvin Yue, Sunnyvale, CA (US); Ramesh Chandra, San Mateo, CA (US); Constantine P. Sapuntzakis, Mountain View, CA (US); John Whaley, San Mateo, CA (US); Guy Messalem, Stanford, CA (US)

(73) Assignee: moka5, Inc., Redwood City, CA (US)

( * ) Notice: Subject to any disclaimer, the term of this patent is extended or adjusted under 35 U.S.C. 154(b) by 1195 days.

(21) Appl. No.: 11/428,008

(22) Filed: Jun. 30, 2006

(65) Prior Publication Data
US 2008/0005121 A1    Jan. 3, 2008

(51) Int. Cl.
*G06F 12/00* (2006.01)
(52) U.S. Cl. .................. 711/115; 711/165; 709/223
(58) Field of Classification Search .............. None
See application file for complete search history.

(56) References Cited

U.S. PATENT DOCUMENTS

| | | | |
|---|---|---|---|
| 7,321,930 B2 * | 1/2008 | Ferguson et al. | 709/223 |
| 7,590,722 B2 * | 9/2009 | Ferguson et al. | 709/223 |
| 2004/0236958 A1 | 11/2004 | Teicher et al. | |
| 2004/0255236 A1 | 12/2004 | Collart | |
| 2005/0044081 A1 * | 2/2005 | Ferguson et al. | 707/10 |
| 2005/0172279 A1 | 8/2005 | Cook et al. | |
| 2006/0101189 A1 | 5/2006 | Chandrasekaran et al. | |
| 2006/0277542 A1 | 12/2006 | Wipfel | |
| 2007/0006205 A1 | 1/2007 | Kennedy et al. | |
| 2007/0089111 A1 | 4/2007 | Robinson et al. | |
| 2007/0162521 A1 | 7/2007 | Raghunath | |
| 2007/0198713 A1 | 8/2007 | Tsao et al. | |
| 2008/0071798 A1 * | 3/2008 | Ferguson et al. | 707/10 |
| 2008/0104588 A1 | 5/2008 | Barber et al. | |

FOREIGN PATENT DOCUMENTS

| | | |
|---|---|---|
| JP | 2006072591 A | 3/2006 |
| WO | 2006/036277 A2 | 4/2006 |
| WO | 2007/149671 A2 | 12/2007 |

OTHER PUBLICATIONS

PCT Search Report, Feb. 19, 2008, PCT.

* cited by examiner

*Primary Examiner*—Kevin Verbrugge
(74) *Attorney, Agent, or Firm*—Park, Vaughan, Fleming & Dowler LLP

(57) ABSTRACT

Methods and apparatus, including computer program products, for network-extended storage. A portable storage device is coupled to a host computer, and network extension code stored on the portable storage device is invoked. The network extension code is operable to detect a file system write function call generated by an application executing on the host computer, the file system write function call operable to cause data to be written to the portable storage device, and cause the data to be written to the portable storage device based upon the file system write function call. The network extension code is further operable to generate a transmit determination indicative of whether to transmit the data to a network repository, and transmit the data to the network repository based upon the transmit determination.

26 Claims, 15 Drawing Sheets

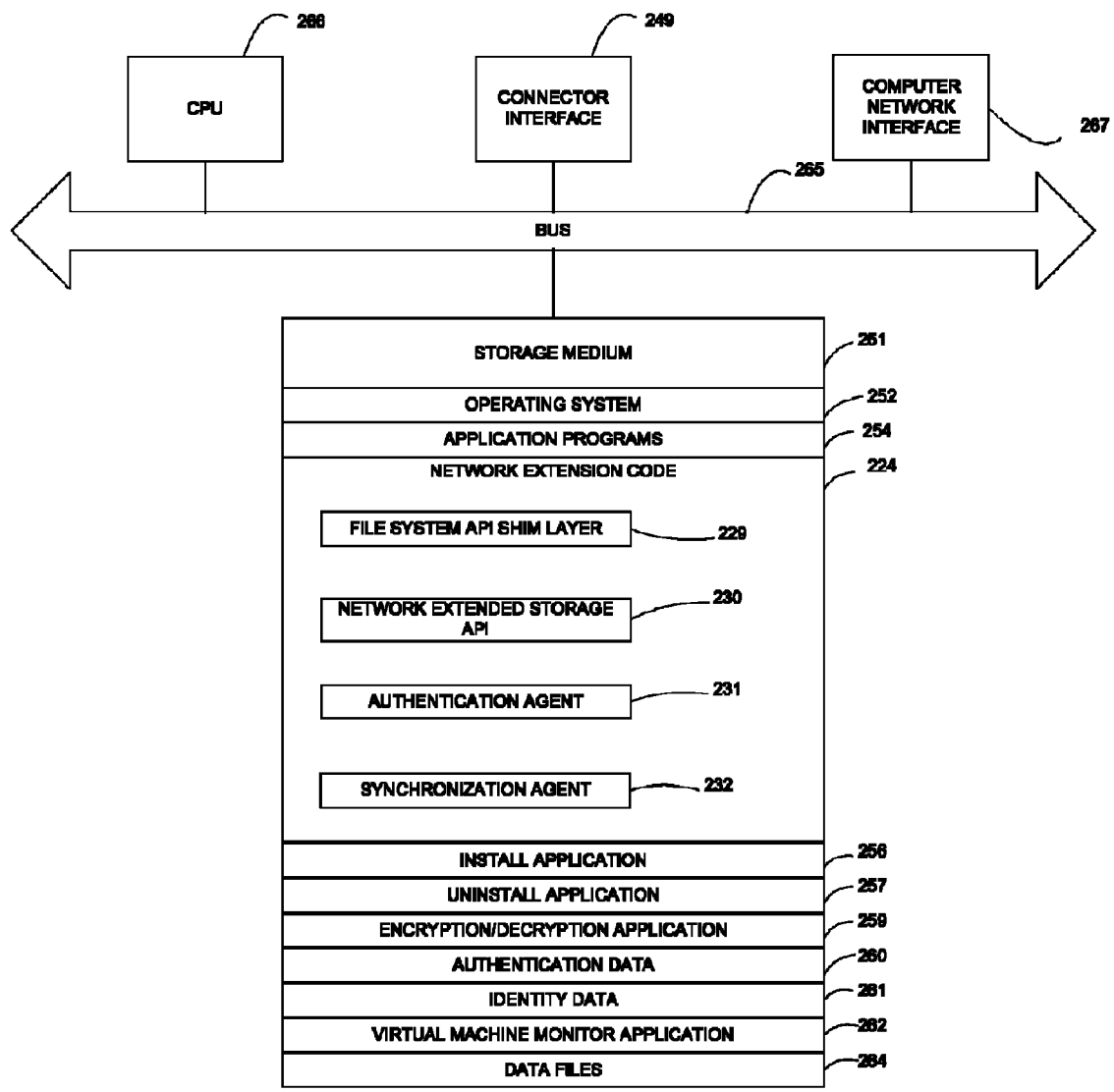

(1 of 2)

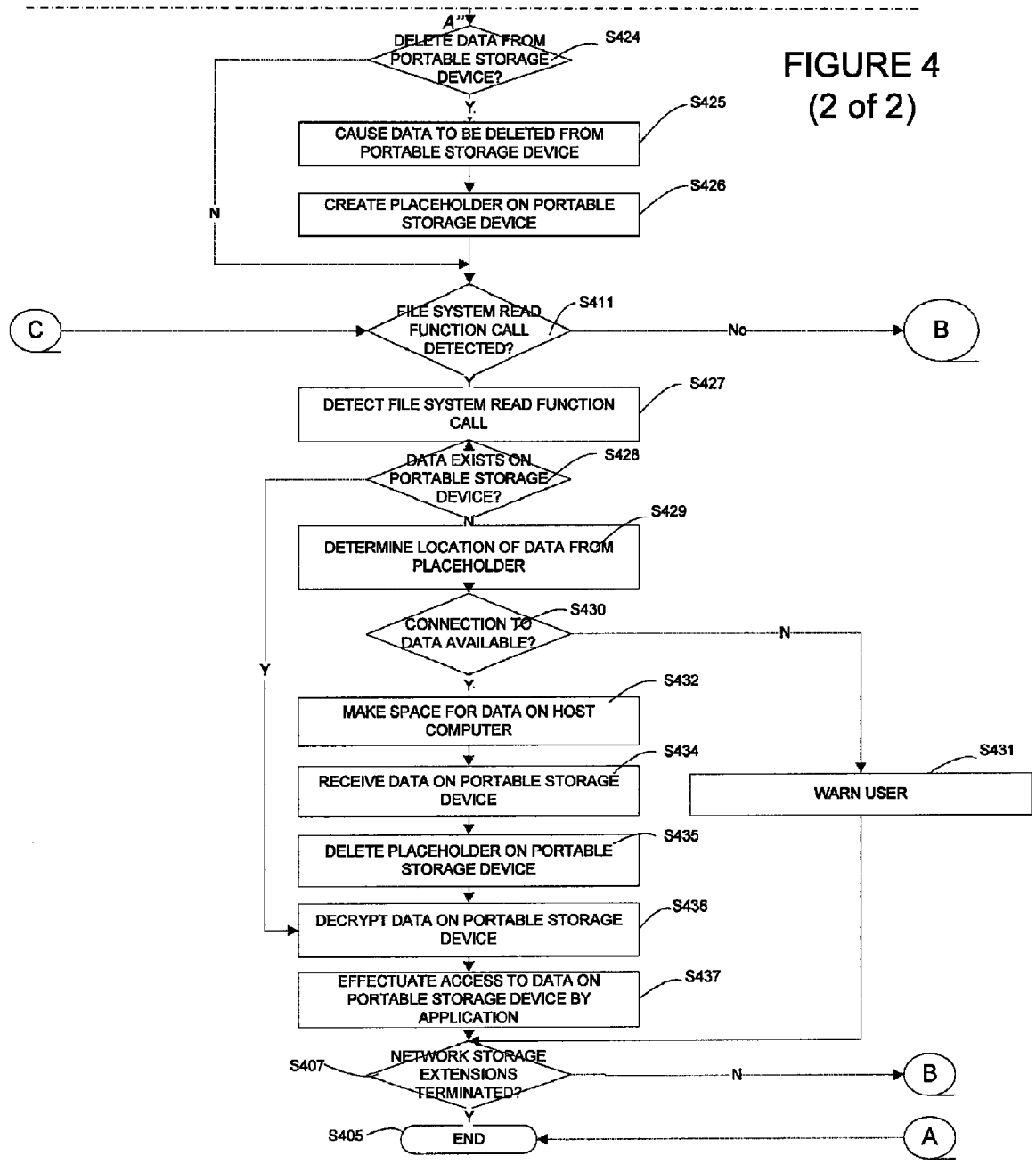
FIGURE 4 (2 of 2)

700

NETWORK-EXTENDED STORAGE

BACKGROUND

The present disclosure generally relates to the storage of data on a network.

It is often a challenge to provide access to data while a user is away from their primary work location. One common approach for providing data access is to equip users with portable computer systems, such as laptop or handheld computers, which allow users to transport data and applications to locations where access to the data is desired. Unfortunately, the drawbacks of this approach are myriad, including the expense associated with outfitting and maintaining portable computer systems, the inherent size and power limitations of mobile components, and exposure to risks associated with system theft, loss or breakage. Furthermore, portable computer systems and accessories are inconvenient to carry and are frequently incompatible with other computer systems at remote locations. Accordingly, the disadvantages of this approach typically outweigh any such benefit.

Another approach to providing access to data while a user is away from their primary work location is to carry the data on a portable memory medium, such as a flash drive, and to utilize remote computer systems to access the data. This approach is also fraught with many other problems, including the fact that portable memory media have limited storage capacity, and that remote computer systems often run incompatible or outdated operating systems or software applications, rendering access to the data stored on the portable memory medium difficult. Furthermore, since remote computer systems may be executing malware, a danger always exists that subsequent users might be able to access sensitive data via local cache or temporary files, or via files which are not permanently deleted or appropriately encrypted.

SUMMARY

According to one general implementation, a computer-implemented method includes coupling a portable storage device to a host computer, and invoking network extension code stored on the portable storage device. The network extension code is operable to detect a file system write function call generated by an application executing on the host computer, the file system write function call operable to cause data to be written to the portable storage device, and cause the data to be written to the portable storage device based upon the file system write function call. The network extension code is further operable to generate a transmit determination indicative of whether to transmit the data to a network repository, and transmit the data to the network repository based upon the transmit determination.

Implementations may include one or more of the following features. For example, the method may further include installing at least a portion of the network extension code onto the host computer, or uninstalling the at least the portion of the network extension code installed onto the host computer. The transmit determination may be based upon one or more of elapsed time, a data type, usage heuristics, available storage space, data modification time, existence of a connection between the host computer and the portable storage device, existence of a connection between the host computer and the network repository, or a user selection. The data may represent a portion of a computer file, or an entire computer file. The portable storage device may be a media player, an APPLE® IPOD® media player, a telephone, a hand-held game system, a navigation system, a smart card, a flash memory such as a compact flash memory, a universal serial bus ("USB") memory stick, or an external hard disk drive.

Additionally, the network extension code may be further operable to generate a delete determination indicative of whether to delete the data from the portable storage device, cause the data to be deleted from the portable storage device based upon the delete determination, and cause a placeholder to be written to the portable storage device, the placeholder indicative of a location of the data. The network extension code may also be operable to encrypt or decrypt the data, or to detect a file system read function call made by the application, the file system read function call operable to read the data on the portable storage device, and effectuate reading the data from the portable storage device to the application. The network extension code may be operable to receive the data from the network repository, and store the data on the portable storage device, or to locate the data based upon the placeholder, and delete the placeholder, or to synchronize the data on the portable storage device with the data on the network repository. The network extension code may be operable to recognize the file system write function call at a block level, a file level, via a host-specific file system driver, or via a user-space dynamic link library.

Moreover, the data may be received from the network repository if the data is not available from the portable storage device, if a placeholder indicative of a location of the data is available on the portable storage device, or if the data on the network repository is more up-to-date than the data on the portable storage device. The network extension code may be operable to pre-fetch the data from the network repository, or to authenticate a user, where authenticating the user may further include receiving a user input, matching the user input with first control data stored on the attached storage device, transmitting a first message to the network repository, if the user input matches the control data, matching the user input with second control data stored on the network repository, receiving an authentication message from the network repository, if the user input matches the second control data, and receiving a revocation message from the network repository, if the user input does not match the second control data. The user input may be password, voice, fingerprint, or biometric data.

According to another general implementation, a portable storage device includes a storage medium storing network extension code, where, when the portable storage device is coupled to a host computer, the network extension code is invoked. The network extension code is operable to detect a file system write function call generated by an application executing on the host computer, the file system write function call operable to cause data to be written to the portable storage device, and cause the data to be written to the portable storage device based upon the file system write function call. The network extension code is further operable to generate a transmit determination indicative of whether to transmit the data to a network repository, and transmit the data to the network repository based upon the transmit determination.

According to another general implementation, a computer program product tangibly stored on a portable storage device including a computer-readable medium, includes instructions to be performed by a host computer when the portable storage device is coupled to the host computer. The instructions are operable to cause the host computer to invoke network extension code stored on the portable storage device, where the network extension code is operable to detect a file system write function call generated by an application executing on the host computer, the file system write function call operable to cause data to be written to the portable storage device, and to cause the data to be written to the portable storage device based upon the file system write function call. The network extension code is further operable to generate a transmit determination indicative of whether to transmit the data to a network repository, and to transmit the data to the network repository based upon determining whether to transmit the data to the network repository.

According to another general implementation, a system includes a network repository, a portable storage device, and a host computer. The portable storage device further includes a storage medium storing network extension code. The network extension code is operable to detect a file system write function call generated by an application, the file system write function call operable to cause data to be written to the portable storage device, cause the data to be written to the portable storage device based upon the file system write function call, generate a transmit determination indicative of whether to transmit the data to a network repository, and transmit the data to the network repository based upon the transmit determination. The host computer is operable to execute the application, and invoke the network extension code when the portable storage device is coupled to the host computer.

Using network-extended storage, which is a form of virtualization, the underlying capacity of the storage medium associated with portable storage device is masked from the application which is writing to the storage medium. Although data written to a portable storage device may physically exist on a remote network repository, the data appears to be stored locally on the portable storage device when the application attempts access.

The details of one or more implementations are set forth in the accompanying drawings and the description below. Other features will be apparent from the description and drawings, and from the claims.

BRIEF DESCRIPTION OF THE DRAWINGS

Referring now to the drawings, in which like reference numbers represent corresponding parts throughout:

FIG. 2B depicts an example of an internal architecture of the portable storage device of FIG. 1.

DETAILED DESCRIPTION

Figure 1:
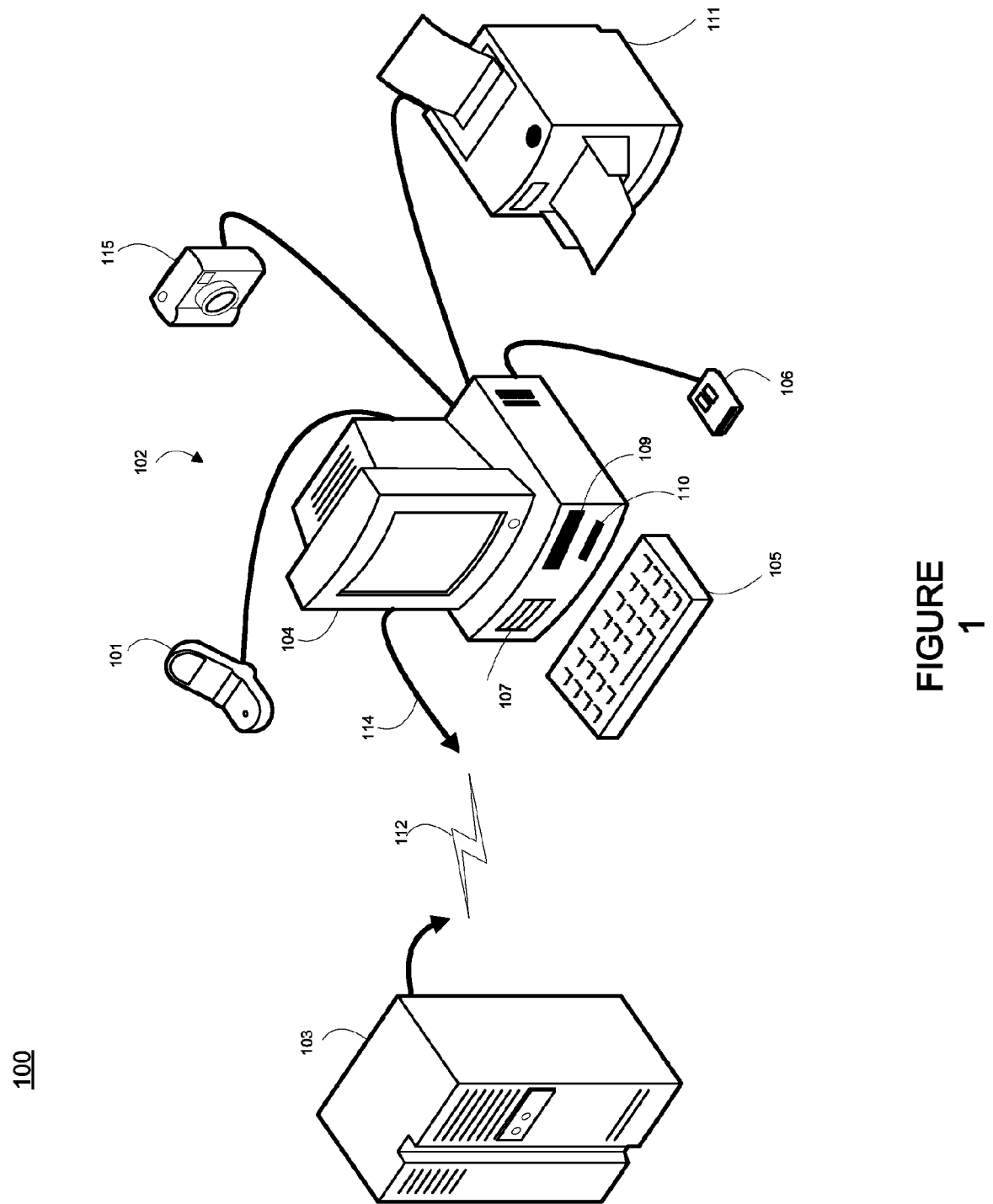
FIG. 1 depicts the exterior appearance of an example system, including a portable storage device coupled to a host computer.

FIG. 1 depicts the exterior appearance of an example system 100, including a portable storage device (or "key") 101 coupled to a host computer 102, where the host computer 102 is connected to a network repository 103. As shown in FIG. 1, the hardware environment of the host computer 102 includes a display monitor 104 for displaying text and images to a user, a keyboard 105 for entering text data and user commands into the host computer 102, a mouse 106 for pointing, selecting and manipulating objects displayed on a display monitor 104, a fixed disk drive 107, a removable disk drive 109, a tape drive 110, a hardcopy output device 111, a computer network 112, a computer network connection 114, and a digital input device 115.

The display monitor 104 displays the graphics, images, and text that comprise the user interface for the software applications used by the system 100, as well as the operating system programs necessary to operate the host computer 102. A user uses the keyboard 105 to enter commands and data to operate and control the computer operating system programs as well as the application programs. The user uses the mouse 106 to select and manipulate graphics and text objects displayed on the display monitor 104 as part of the interaction with and control of the host computer 102 and applications running on the host computer 102. The mouse 106 is any type of pointing device, and may be a joystick, a trackball, a touch-pad, or other pointing device. Furthermore, the digital input device 115 allows the host computer 102 to capture digital images, and may be a scanner, a digital camera, a digital video camera, or other digital input device.

Software used to invoke network extension code is stored locally on computer readable memory media, such as the fixed disk drive 107, where 'network extension code' generally refers to any computer code which instruments, or inserts code into, the executable code for an application executing on a computer. More particularly, network extension code relates to code that enables a computer to redirect function calls, procedure invocations and method invocations (hereinafter collectively referred to as "function calls") from an original code path to a modified code path, so as to enable the computer to seamlessly access network-extended storage without requiring that storage applications be preinstalled or loaded. In one particular example, network extension code implements this redirection or modification of function calls using code comprising file system application program interface ("API") shim layer code and network extended storage API code, where the 'shim' refers to a software component inserted at an interface between the application and the operating system.

In a further implementation, the fixed disk drive 107 itself may include a number of physical drive units, such as a redundant array of independent disks ("RAID"), or may be a disk drive farm or a disk array that is physically located in a separate computing unit. Such computer readable memory media allow the host computer 102 to access computer-executable process steps, application programs and the like, stored on removable and non-removable memory media.

The network connection 114 may be a modem connection, a local-area network ("LAN") connection including the Ethernet, or a broadband wide-area network ("WAN") connection such as a digital subscriber line ("DSL"), cable high-speed internet connection, dial-up connection, T-1 line, T-3 line, fiber optic connection, or satellite connection. The network 112 may be a LAN network, a corporate or government WAN network, the Internet, or other network.

The removable disk drive 109 is a removable storage device that is used to off-load data from the host computer 102 or upload data onto the host computer 102. The removable disk drive 109 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a Universal Serial Bus ("USB") flash drive, thumb drive, pen drive, key drive, or any one of the various recordable or rewritable digital versatile disk ("DVD") drives such as the DVD-Recordable ("DVD-R" or "DVD+R"), DVD-Rewritable ("DVD-RW" or "DVD+RW"), or DVD-RAM. Operating system programs, applications, and various data files, are stored on disks, which are stored on the fixed disk drive 107 or on removable media for the removable disk drive 109.

The tape drive 110 is a tape storage device that is used to off-load data from the host computer 102 or to upload data onto the host computer 102. The tape drive 110 may be a quarter-inch cartridge ("QIC"), 4 mm digital audio tape ("DAT"), 8 mm digital linear tape ("DLT") drive, or other type of tape.

The hardcopy output device 111 provides an output function for the operating system programs and applications. The hardcopy output device 111 may be a printer or any output device that produces tangible output objects, including textual or image data or graphical representations of textual or image data. While the hardcopy output device 111 is depicted as being directly connected to the host computer 102, it need not be. For instance, the hardcopy output device 111 may be connected via a network interface, such as a wired or wireless network.

The host computer 102 is directly or indirectly coupled to the portable storage device 101. The portable storage device 101 is any portable device which includes a storage medium and a connector which effectuates a coupling between the portable storage device 101 and the host computer 102, so as to effectuate unidirectional or bidirectional transmission of data between the portable storage device 101 and the host computer 102. The connector may be a wired or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS® ("IEEE®") Standard 802.11 wireless connector, a BLUETOOTH® wireless connector, an orthogonal frequency division multiplexing ("OFDM") ultra wide band ("UWB") wireless connector, a time-modulated ultra wide band ("TM-UWB") wireless connector, or other wireless connector. Example wired connectors include, for example, IEEE®-1394 FIREWIRE® connector, USB connector, serial port connector, parallel port connector, or other wired connector. The portable storage device 101 may be a media player such as an APPLE® IPOD® media player, a telephone, a hand-held game system, a navigation system, a smart card, a flash memory such as a compact flash memory, a USB memory stick or flash drive, an external hard disk drive, a thumb drive, a pen drive, a personal digital assistant ("PDA"), a MICROSOFT® POCKETPC® device, a PALM® TREO™ device, or a key drive.

Applications running on the host computer 102 can directly access the data stored on the portable storage device 101 even when the computer is not connecting to the network. The storage capacity of the portable storage device 101 is typically limited, and data stored therein is vulnerable to loss from hardware failure, theft, or damage.

The host computer 102 is connected to the network repository 103 via the network 112. In general, the network repository 103 is a server or other network-attached storage device that is dedicated to file sharing. Using network repository 103, storage of data no longer remains an integral function of the host computer 102. Rather, the host computer 102 handles the processing of data via file system read and write function calls, but the network repository 103 delivers the data to the host computer 102 and the user, as appropriate.

The network repository 103 may or may not be located within the host computer 102, although in one implementation the network repository 103 exists remotely on a network, and is made of one or more networked network repository devices or servers. Applications requesting data stored on the network repository 103 will not be able to access the data, or the most updated data, if the host computer 102 and the network repository 103 are disconnected. The network repository 103 executes software which services requests sent by the host computer 102, where the network repository 103 may include a server farm, a storage farm, or a network-extended storage server.

Although the host computer 102 is illustrated in FIG. 1 as a desktop PC, in further implementations the host computer 102 may be a laptop, a workstation, a midrange computer, a mainframe, an embedded system, telephone, a handheld or tablet computer, a personal digital assistant ("PDA"), or other type of computer.

Although further description of the components which make up the network repository 103 is omitted for the sake of brevity, it suffices to say that the hardware environment of the computer or individual networked computers which make up the network repository 103 is similar to that of the exemplary hardware environment described herein with regard to the host computer 102. In an alternate implementation, the functions of the host computer 102 and the network repository 103 are combined in a single, combined hardware environment, such as the case where the host computer 102 is itself a repository for data written to the portable storage device 101.

Figure 2A:
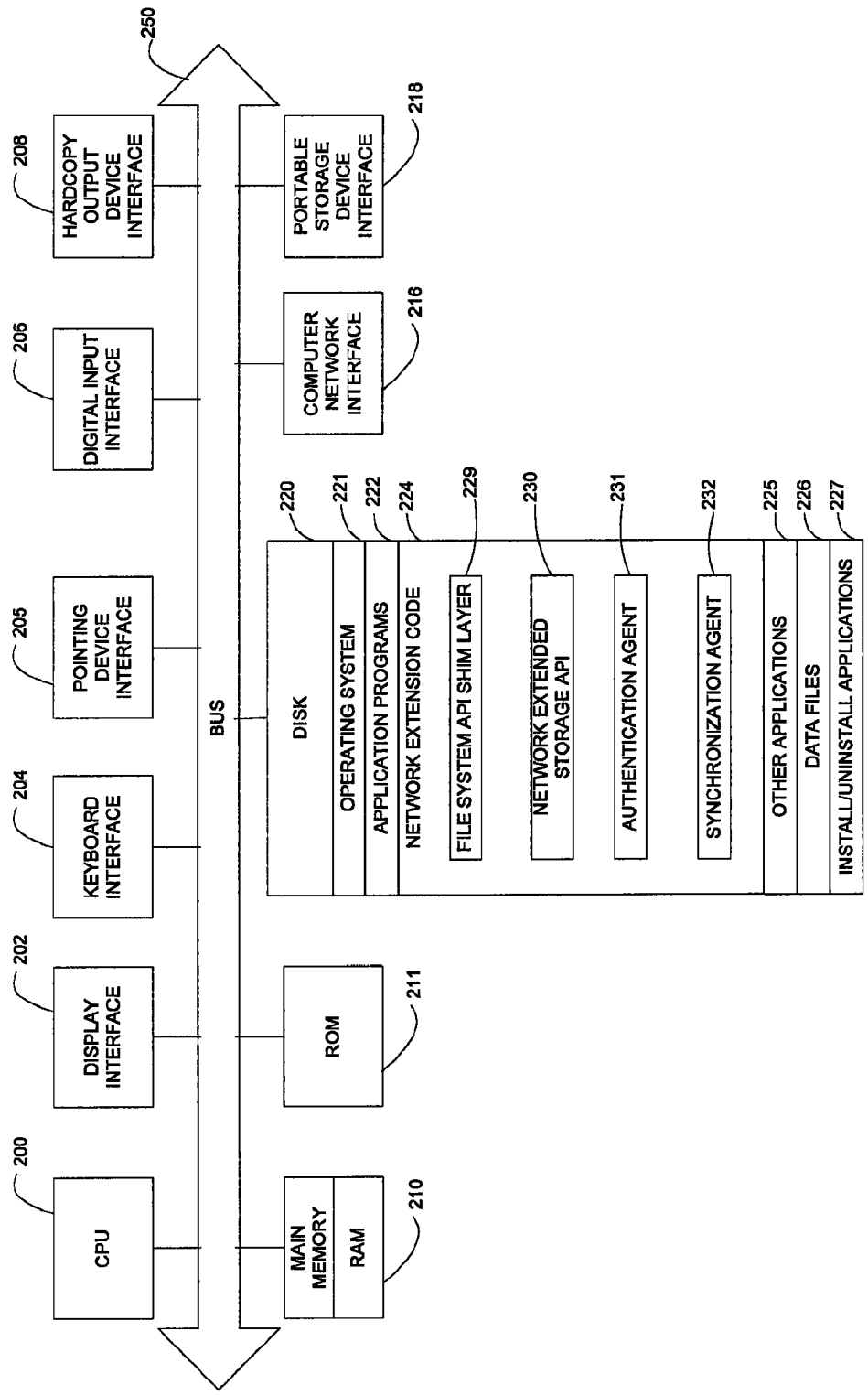
FIG. 2A depicts an example of an internal architecture of the host computer of FIG. 1.

FIG. 2A depicts an example of an internal architecture of the host computer 102, as implemented in FIG. 1. The computing environment includes a computer central processing unit ("CPU") 200 where the computer instructions that comprise an operating system or an application are processed; a display interface 202 which provides a communication interface and processing functions for rendering graphics, images, and texts on the display monitor 104; a keyboard interface 204 which provides a communication interface to the keyboard 105; a pointing device interface 205 which provides a communication interface to the mouse 106 or an equivalent pointing device; a digital input interface 206 which provides a communication interface to the digital input device 115; a hardcopy output device interface 208 which provides a communication interface to the hardcopy output device 111; a random access memory ("RAM") 210 where computer instructions and data are stored in a volatile memory device for processing by the computer CPU 200; a read-only memory ("ROM") 211 where invariant low-level systems code or data for basic system functions such as basic input and output ("I/O"), startup, or reception of keystrokes from the keyboard 105 are stored in a non-volatile memory device; and optionally a storage 220 or other suitable type of memory (e.g. such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 221, application programs 222 (including, optionally, network extension code 224, other applications 225, and install/uninstall applications 227 which install and uninstall network extension code to the host computer 102, as necessary) and data files 226 are stored; a computer network interface 216 which provides a communication interface to the computer network 112 over the computer network connection 114; and a portable storage device interface 218 which provides a wired or wireless communication interface to the portable storage device 101. The constituent devices and the computer CPU 200 communicate with each other over the computer bus 250.

The RAM 210 interfaces with the computer bus 250 so as to provide quick RAM storage to the computer CPU 200 during the execution of software programs such as the operating system application programs, and device drivers. More specifically, the computer CPU 200 loads computer-executable process steps from the fixed disk drive 107, the portable storage device 101, or other memory media into a field of the RAM 210 in order to execute software programs. Data is stored in the RAM 210, where the data is accessed by the computer CPU 200 during execution.

Also shown in FIG. 2A, the host computer 102 stores computer-executable code for a windowing operating system 221, application programs 222 such as word processing, spreadsheet, presentation, gaming, or other applications. Although it is possible to provide network extended storage to a user using the above-described implementation, it is also possible to implement the functions according to the present invention as a dynamic link library ("DLL"), or as a plug-in to other application programs such as an Internet web-browser such as the MICROSOFT® Internet Explorer web browser.

The computer CPU 200 is one of a number of high-performance computer processors, including an INTEL® or AMD® processor, a POWERPC® processor, a MIPS® reduced instruction set computer ("RISC") processor, a SPARC® processor, an ACORN® RISC Machine ("ARM®") architecture processor, a HP ALPHASERVER® processor or a proprietary computer processor for a mainframe. In an additional arrangement, the computer CPU 200 is more than one processing unit, including a multiple CPU configuration found in high-performance workstations and servers, or a multiple scalable processing unit found in mainframes.

The operating system 221 may be MICROSOFT® WINDOWS NT®/WINDOWS® 2000/WINDOWS® XP Workstation; WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPEN-VMS® for HP ALPHASERVER®-based computers, MAC OS® X for POWERPC® based workstations and servers; SYMBIAN OS®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 221 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT®.NET Compact.

The network extension code 224 is invoked by the host computer 102. Invocation of the network extension code 224 may occur manually, such as when the user enters commands to invoke the network extension code 224, or automatically, such as when no user interaction is required. In one implementation, the portable storage device 101 is a USB flash memory device, and the network extension code 224 is automatically invoked when the portable storage device 101 is wired or wirelessly coupled to the USB port of the host computer 102, such as by using autorun code. The network extension code 224 may include a file system API shim layer 229, a network extended storage API 230, an authentication agent 231, and a synchronization agent 232. Network extension code 224 may be kernel extension code.

The network extension code 224 and the install/uninstall applications 227 may be host-specific. For instance, the network extension code 224 may include code for providing network extended storage functionality to non-PC devices. Since mobile telephones, for example, may store data on the network repository in a particular file format, such as FAT32, the network extension code 224 and/or the install/uninstall applications 227 is tailored to implement network extension on the mobile telephone operating system, to enable the reception of data that is not locally cached on the mobile telephone, and to back up modified data onto a network repository.

The file system API shim layer 229 detects the file system read and write function calls, or API calls, made by the application to the operating system. These function calls are then re-directed from the original code path to a different code path with the additional network extended storage functionality, where the capturing and re-direction is accomplished by instrumenting the application binary code. Accordingly, the original function call is replaced with a modified function call, the modified function call having additional functionality which enables the host computer to handle the optimized data storage format. In the MICROSOFT® WINDOWS® operating system, the CREATEFILE and CLOSEHANDLE functions are instrumented in order to effectuate network-extended opening and closing of data files, the READFILE, READFILEEX, WRITEFILE, and WRITEFILEEX functions are instrumented to effectuate network-extended reading and writing data, the LOCKFILE and UNLOCKFILE functions are instrumented to instrument network-extended locking and unlocking of data, the FINDFIRSTFILE, FINDNEXTFILE, FINDCLOSE functions are instrumented to effectuate network-extended enumerating a directory, and the GETFILETYPE, GETFILESIZE, and GETFILEATTRIBUTES functions are instrumented to effectuate network-extended metadata operations.

Among many features, the network extension code 224 provides bottomless, encrypted and disconnected access to data by changing how the operating system accesses the data. For the MICROSOFT® WINDOWS® operating system, the network extension code 224 implements a file system filter driver which maintains a cached data or a placeholder associated with the data on the portable storage device, and intercepts, captures or otherwise detects a file system read function call to the user data. If the file system read function call can be satisfied from cached data, the file system read function call is redirected to the cached data. Otherwise, metadata included in the placeholder is used to access the data from a network repository, receive the data to the portable storage device, and redirect the file system read function call to the stored local copy.

The network extended storage API 230 includes one or more APIs which provide the virtualized presentation of the storage to the application. After the file system API shim layer 229 detects the function calls, the function calls are redirected to the appropriate network extended storage API 230. The network extended storage API 230 includes, at a minimum, open, read, write, lock, synchronize, and close APIs, referred to as "nes_open( )", "nes_read( )", "nes_write( )", "nes_lockf( )", "nes_sync( )", "nes_close( )", respectively.

The authentication agent 231 authenticates the use of the network repository 103 and the portable storage device 101, as discussed in detail below with reference to the method 500 and FIG. 5. The synchronization agent 232 pushes modified data from the portable storage device 101 to the network repository 103, and/or pre-fetches data from the network repository 103 to the portable storage device 101, based on factors such usage patterns. Further details of the synchronization and pre-fetching operations performed by the synchronization agent 232 are discussed in detail below with reference to the methods 600, 700 and 1100, and FIGS. 6, 7 and 11.

In this regard, and in summary, the system 100 includes the network repository 103, the portable storage device 101, and the host computer 102. The portable storage device 101 further includes a storage medium storing the network extension code 224. The network extension code 224 is operable to detect a file system write function call generated by the application programs 222, the file system write function call operable to cause data to be written to the portable storage device 101, cause the data to be written to the portable storage device 101 based upon the file system write function call, generate a transmit determination indicative of whether to transmit the data to the network repository 103, and transmit the data to the network repository 103 based upon the transmit determination. The host computer 102 is operable to execute the application programs 222, and invoke the network extension code 224 when the portable storage device 101 is coupled to the host computer 102.

FIG. 2B depicts an example of an internal architecture of the portable storage device 101, as implemented in FIG. 1. The computing environment includes, at a minimum, a connector interface 249 which provides a communication interface to a wired or wireless connector which effectuates unidirectional or bidirectional transmission of data between the portable storage device 101 and a computer; and a storage medium 251 which includes a memory such as RAM, ROM, PROM, EPROM, EEPROM, magnetic disks, optical disks, floppy disks, hard disks, removable cartridges, or flash drives, where the files that comprise the network extension code 224, data files 264 and, optionally, an operating system 252, application programs 254, an install application 256, an uninstall application 257, an encryption/decryption application 259, authentication data 260, identity data 261, and/or a virtual machine monitor application 262 are stored. The constituent devices communicate with each other over a portable storage device bus 265. The computing environment may further include a CPU 266 and/or a computer network interface 267.

Data files 264 is the storage space associated with the portable storage device 101, which provides limited storage near the host computer 102 to increase data access performance and to allow a user to access the data without attaching the host computer 102 to the network. The data files 264 also stores control data, such as username and password data, an identifier uniquely identifying the portable storage device 101, the network address of the network repository 103, performance statistics and/or error logs. The identifier is stored in memory, and gives the portable storage device 101 an identity.

Where the user operates a PALM® TREO™ device with flash memory storing network extension code, the flash memory can be coupled to the host computer, and the host computer can utilize the flash memory as a local cache for the network repository. If the flash memory is then decoupled from the host computer and re-associated with the PALM® TREO™ device, the PALM® TREO™ device can again use the flash memory. In this regard, the storage medium associated with the portable storage device can be a stand-alone storage medium for use with network extended storage alone, or it can be part of a portable storage device which has another purpose.

While FIGS. 1, 2A, and 2B illustrate one possible implementation of a computing system that executes program code, or program or process steps, configured to effectuate network extended storage, other types of computers may also be used as well.

Figure 3:
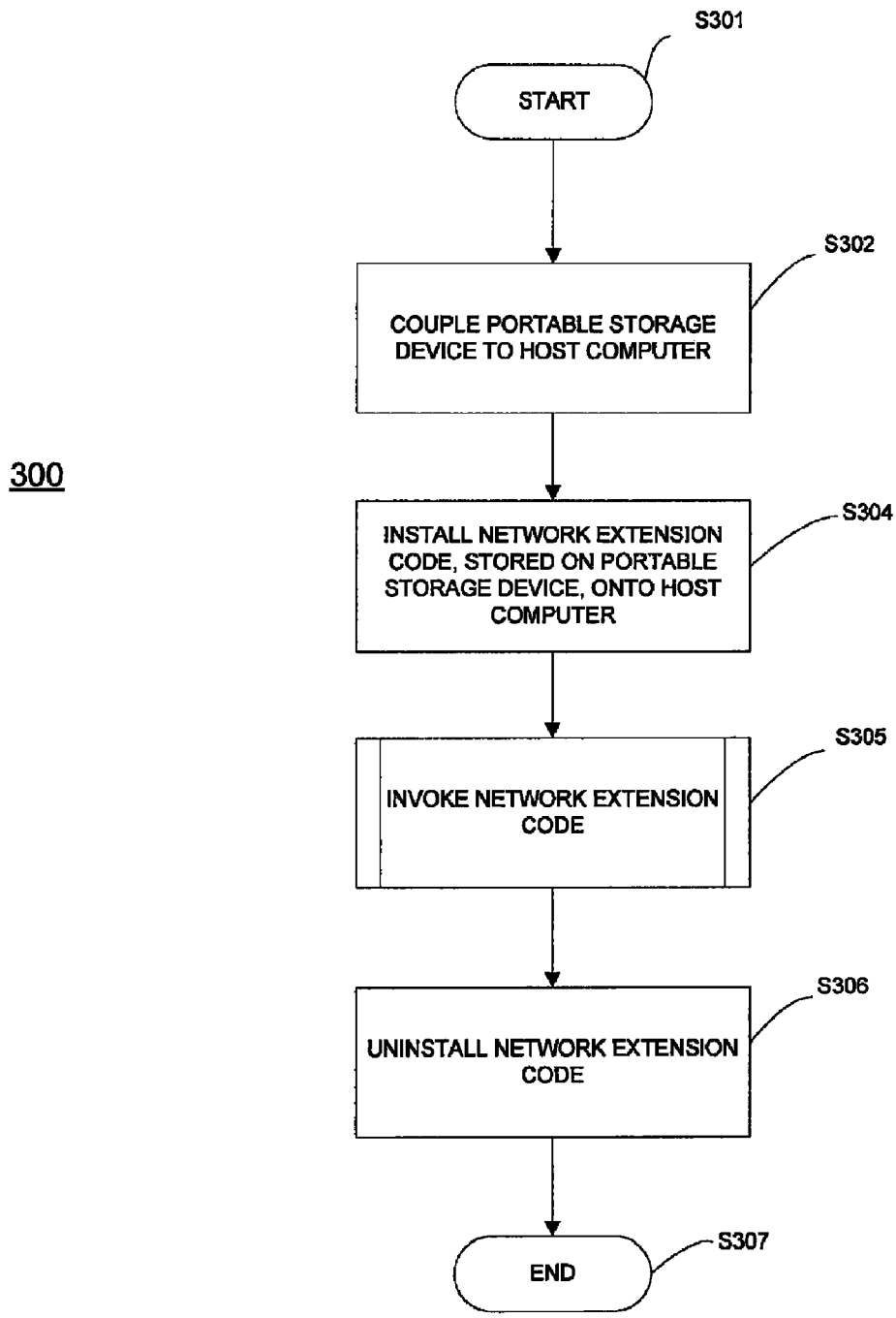
FIG. 3 is a flow chart illustrating a computer-implemented technique in accordance with one general implementation.

FIG. 3 is a flowchart illustrating computer-implemented method 300 in accordance with one general implementation. Briefly, the computer-implemented method includes coupling a portable storage device to a host computer, and invoking network extension code stored on the portable storage device. The network extension code is operable to detect a file system write function call generated by an application executing on the host computer, the file system write function call operable to cause data to be written to the portable storage device, and cause the data to be written to the portable storage device based upon the file system write function call. The network extension code is further operable to generate a transmit determination indicative of whether to transmit the data to a network repository, and transmit the data to the network repository based upon the transmit determination.

With the network-extended storage virtualization approach, the storage capacity of a portable storage device coupled to a host computer is virtualized, or extended beyond its physical capacity, by transparently providing the portable storage device with a back-end network repository over a network connection. A determination is dynamically generated as to which data is stored on the portable storage device and the network repository, by factors such as data usage, without requiring user interaction. Data stored to the network repository is seamlessly pulled from the network repository to the local storage as the application requests it, without requiring that the user be aware of the access. New or modified data is written onto the portable storage device, and then is transparently transmitted and stored to the network repository as appropriate.

In this regard, the storage capacity provided to an application running on the host computer is limited merely by the large storage capacity of the back-end network repository, and not the limited storage capacity of the network storage device. Furthermore, since the network repository may be protected in a data center environment, the data stored on the network repository is backed-up and secured. Moreover, since a version or placeholder of the data resides on the portable storage device, the application still has limited access to network-stored data in the case of a loss of network connection.

In more detail, when method 300 begins (step S301), a portable storage device is coupled to a host computer (step S302). Any device with embedded memory, including non-personal computer devices, can be used to provide network extended storage functionality, or to merely back up data. For instance, the portable storage device may be a mobile telephone, where the mobile telephone is used to back up, or locally cache data that has been saved to the network repository via the network. In the case where a mobile telephone is used, the mobile telephone's wireless cellular network may be used to provide network connectivity, such as where the host computer does not have a network connection. If the mobile telephone is coupled to the host computer, the computer may use the mobile telephone's flash memory as a local cache for the data, and further use the mobile telephone's connectivity to connect to the network repository.

Network extension code, stored on the portable storage device, is installed onto the host computer (step S304). In an alternate implementation, a portion of the network extension code is installed onto the host computer, or none of the network extension code is installed onto the host computer. The network extension code is invoked (step S305), such as by running, executing or otherwise calling the network extension code stored on the portable storage device or host computer. Once invoked, the network extension code is operable to perform the method 400, which is detailed more fully below, with reference to FIG. 4.

By "network-extending" storage via invocation of the network extension code, it is not merely intended that the storage capacity of the portable storage device be extended. Network extension further allows the use of the network to be hidden, or be transparent from the user, such that the user is not required to separately invoke any applications on the portable storage device or the host computer to achieve functionality. Furthermore, although the network and the network repository are generally accessed, the portable storage device may also be used in a disconnected mode by the host computer, and the data can be embedded and accessed by any other active device. Transparency is achieved without requiring that the portable storage device have active processing power, or without pre-installing the host computer with software to effectuate network-extended storage functionality. Instead, and to its benefit, the network extension code augments an existing, underlying operating system with manually or automatically installed extensions, improving system performance by allowing the host computer to access a locally cached copy of the data without requiring use of a network connection.

In one example implementation, when the portable storage device is coupled to the host computer, an icon representing the portable storage device is displayed on the display of the host computer. Selecting the icon produces a login screen, into which the user enters a user name and password which are authenticated over the network, or checked against the user's password for the last successful network login. Subsequently, the user can access data on the portable storage device, even if the data is actually written to the network repository, where no additional actions are required on the user's part to allow for storage of data in excess of the storage capacity of the portable storage device. The user is also enabled to manually elect which data should be stored to the portable storage device or the network repository.

If the network extension code, or a portion of the network extension code, is installed to the host computer, the network extension code or portion of the network extension code is uninstalled from the host computer (step S306), and method 300 ends (step S307). Although no hardware support or pre-installed software is required on the host computer, once the portable storage device is removed from the host computer no traces of the network extension code remain.

Although FIG. 3 describes one example hardware implementation in which network extended storage may be effectuated at the block level, other implementations are also contemplated. In particular, a file system function call initiated by an application goes through several layers of abstraction, such as the user space level, the operating system kernel, or the hardware level. Network extended storage can occur via network extension code which uses any of these levels.

In a file system driver implementation, a file system driver for a particular operating system can include or invoke network extension code, such that the driver intercepts requests to the file system on the portable storage device, to perform associated network extension functions, such as the functions described below. In this regard, the functionality of the file system is changed by implementing new file system drivers, or adding file system filter drivers which perform network extension functions.

In a user-space shimming implementation, a user-space DLL shim may detect, capture, or intercept file system call, such as an NT file system call in NTDLL.DLL for WINDOWS NT® file system functions, that are performed by applications. The user-space DLL shim determines whether the system calls access the file system on the portable storage device and, if so, the network extension functions are performed. At the time each application is loaded, the application is linked with a network extension DLL ahead of the standard NTDLL.DLL, where the network extension DLL performs the associated network extension function.

In a further implementation, the portable storage device includes a CPU and/or an independent network connection. The network extension functions may then be invoked by the portable storage device CPU, such that the portable storage device CPU, not the host computer CPU, is involved in the detection of data written to the portable storage device, the generation of a transmit determination, and the transmission of the data to the network repository. The portable storage device keeps track of data written to the portable device storage medium. Upon receiving a signal to read data, the portable storage device itself performs the network extension functions, including fetching the data over the network.

In this regard, the network extension code may be operable to recognize the file system write function call at a block level, a file level, via a host-specific file system driver, via a user-space dynamic link library, or using other techniques or approaches.

Figure 4:
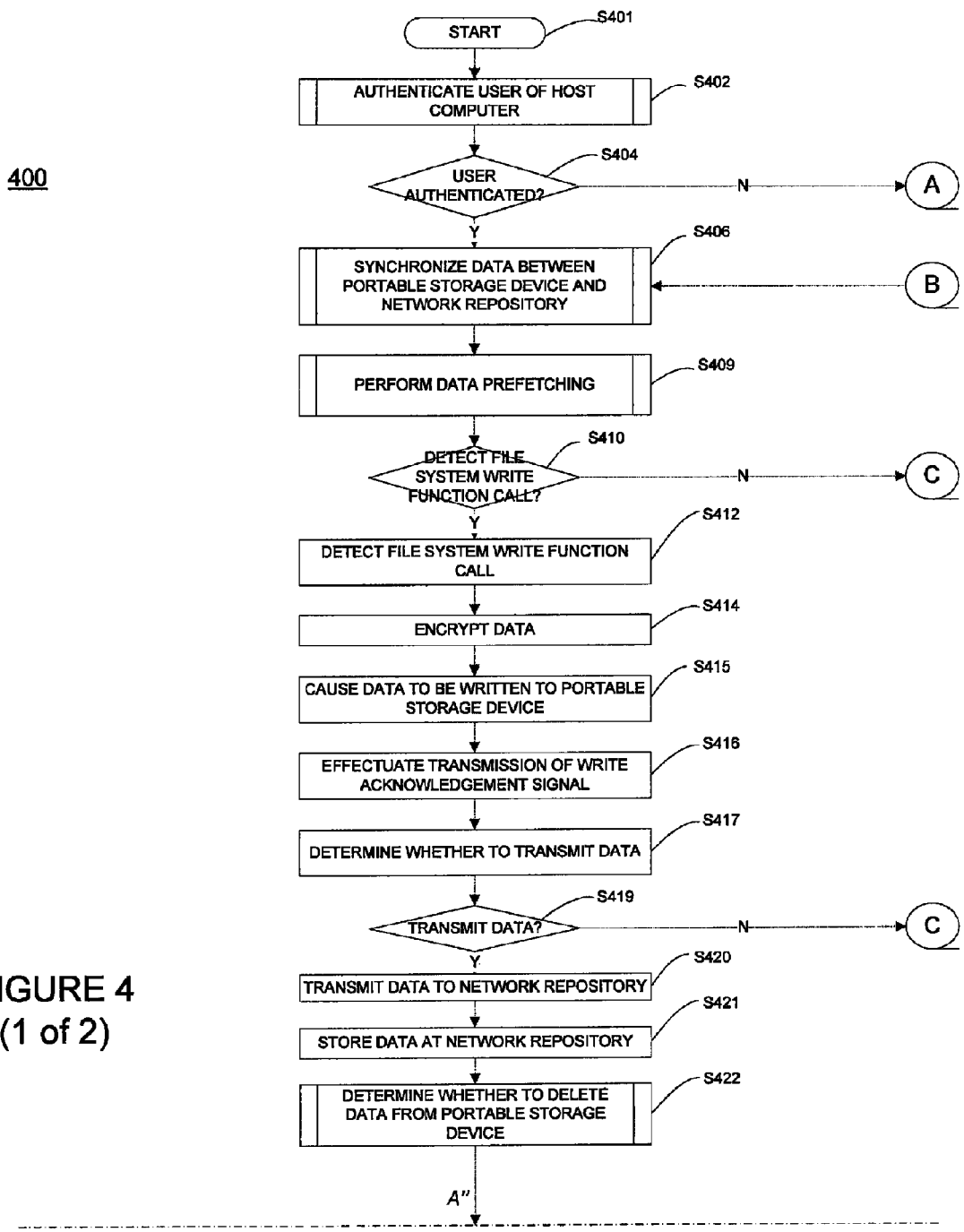
FIG. 4 is a flowchart illustrating a technique which is performed when the network extension code is invoked, in accordance with another general implementation.

FIG. 4 is a flowchart illustrating the method 400, in accordance with another general implementation. The method 400 is performed when the network extension code is invoked, as described in step S305, above. In more detail, the method 400 begins (step S401), and the user of the host computer is authenticated (step S402). Briefly, authentication provides two-way protection of the data, actively querying and verifying the user's identity on the host computer as well as the network repository. Three-way protection is also provided by the user's physical control of access to the data, via the portability of the storage device. Where the identity of the user is not established on the network repository, access rights to the portable storage device in a disconnected mode can be revoked using a revocation signal or indicator. In this regard, the network identification data is in effect a 'master' password, such that control data stored on the portable storage device can be used to provide authorization in the case where the network connection is inoperable.

Authentication, as performed by the authentication agent, is detailed more fully below with reference to the method 500 and FIG. 5. In additional implementations, other approaches for authentication are used, authentication is omitted altogether, authentication occurs earlier or later in the method 400, or occurs in parallel with other steps.

If the user is not authenticated (step S404), the method 400 ends (step S405). If the user is authenticated (step S404), data is synchronized between the portable storage device and the network repository (step S406), where the data may represent a single bit, a portion of a computer file, an entire computer file, or several computer files.

Data synchronization may occur as part of an auto-restore operation, in which data is automatically restored on a portable storage device, such as a new portable storage device which replaces a lost or stolen portable storage device. As part of the auto-restore operation, data resident on the network repository can be synchronized with, or restored to, the portable storage device once the user is authenticated, avoiding cataclysmic loss of data. In the case where an original portable storage device is stolen, the synchronization operation would be effective to revoke access to the stolen portable storage device to the data stored on the network repository, once the bona fide user has authenticated and registered the new, replacement portable storage device. In this regard, replacing a lost, stolen, damaged, or outdated portable storage device is a trivial matter, since a user is enabled to use a new portable storage device, and receive new or refreshed data.

Data synchronization is detailed more fully below, with reference to the methods 600 and 1100, and FIGS. 6 and 11. Other synchronization approaches may be used, or synchronization may be omitted altogether, may occurs earlier or later in the method 400, or may occur in parallel with other methods or steps. Although FIG. 4 depicts synchronization as occurring at the time of login, synchronization may occur at any point once the network extension code is invoked.

Data pre-fetching occurs (step S409), where pre-fetching relates to the access of data which is not stored on the portable storage device, based upon heuristics or pre-defined specifications, prior to receiving a file system read function call which requests access to the data. Pre-fetching is implemented in order to reduce the latency associated with accessing data which is stored on the network repository. Data pre-fetching is detailed more fully below, with reference to the methods 700 and 1000, although other pre-fetching approaches may be used, pre-fetching may not occur or may occur earlier or later in the method 400, or pre-fetching may occur in parallel with other methods or steps.

The network extension code waits for the detection of a file system write function call (step S410) or a file system read function call (step S411). When a file system write function call is detected, such as when data is written to the portable storage device for the first time, the file system write function call is detected (step S412). If a file system write function call is generated, the data is first written to the portable storage device before it is transparently synchronized with the networked repository. The network extension code may detect a file system read or write function call by either intercepting the function call as an intermediary, by receiving a function call that has already been transmitted to and received by the file system, or by other techniques. In one instance where the network extension code operates as an intermediary between the application and the file system, the network extension code may selectively allow to application to communicate directly with the file system, via a direct handle.

The data is encrypted (step S414), and the data is written to the portable storage device, based upon the detected file system write call (step S415). Although the data stored on the portable storage device is encrypted without requiring hardware support on the storage device or pre-installed software on the host computer, in an additional implementation the data is selectively encrypted, or not encrypted at all. In one implementation, when the portable device is connected to the machine, a process which is automatically launched on the host computer periodically checks which data has been changed, and writes the changed data back the over the network in the case the machine is connected to the network.

A write acknowledgement signal is transmitted (step S416). Typically, a file system responds to a file system write function call with an acknowledgement signal indicating that the write operation has occurred successfully. Thus, in the case where the network extension code is capturing the file system write call, it must also generate, or spoof a write acknowledgement signal that would have been ordinarily generated in typical course. The network extension code generates such an acknowledgement signal. In an additional implementation, the write acknowledgement signal is not transmitted, or a write error or other signal is transmitted.

A transmit determination is generated, the transmit determination being indicative of whether to transmit the data to a network repository (step S417). The transmit determination is based upon one or more of elapsed time, a data type, usage heuristics, available storage space, data modification time, existence of a connection between the host computer and the portable storage device, existence of a connection between the host computer and the network repository, a user selection, or other factors.

Any changes made to the data on the portable storage device are transparently moved to the network repository, so as to back up changes to the data at the earliest appropriate time. However, the question of what data to keep stored on the portable storage device and what data to transmit to the network repository is based upon a cache eviction algorithm, since the portable storage device becomes, in effect, a cache of the network repository. The cache eviction algorithm can also be based on, for example, time of use, frequency of use, user selection, type and size of data, and relation between data (such that all data relating to a particular project get similar treatment), or other factors. The transmit determination may also be based, for example, on an indication that the portable storage device has run out of space, thereby allowing the network extension code to apply optimizations to the data existing on the portable storage device, and increase storage availability.

Although data stored on a portable storage device can be directly accessed by applications running on a host computer, even when the computer is not connected to the network, the storage capacity of a portable storage device is typically limited, and data stored therein is vulnerable to loss from hardware failure, theft, or damage. In this regard, the transmit determination is generated to determine which files on the portable storage device should be moved to a network repository, based upon factors such as storage capacity, and importance of the data under consideration.

Since the network extension code is also operable in a disconnected mode, the user can specify which data is to be stored on the portable storage device, so that the data will be accessible even when the host computer is not connected to the network. In this case, the transmit determination would be based at least in part upon the user's specification.

If the transmit determination indicates (at step S419) that the data is to not be transmitted to the network repository, the network extension code waits for the detection of a file system read function call (step S411) or another file system write function call (step S410). If the transmit determination indicates (at step S419) that the data is to be transmitted to the network repository, the data is transmitted to the network repository (step S420), and the data is stored at the network repository (step S421). Using network-extended storage, and via virtualization, the underlying capacity of the storage medium associated with portable storage device is masked from the application which is writing to the storage medium. In instances where the network repository is included within the host computer, such as where the network repository is resident on the host computer's fixed disk drive, the transmission of the data (at step S419) does not necessarily occur via a network, and may occur via communication internal to the host computer, such as via the bus 250.

Unique identifier information on the portable storage device is used for the receipt of licensed data. In one arrangement, the unique identifier includes a decryption key, such that licensed data is released to a particular portable storage device by decrypting the data using the unique identifier information.

Once transmitted to and stored at the network repository, a delete determination is generated, the delete determination indicative of whether to delete the data from the portable storage device (step S422). The generation of a delete determination is described more fully below, with reference to FIGS. 8 and 10. In one implementation, such as where none of the data is to be deleted from the portable storage device, a delete determination is not generated. In another implementation, the delete determination occurs earlier or later in the method 400, or occurs in parallel with other steps.

If the delete determination indicates (at step S422) that the data is not to be deleted from the portable storage device, the network extension code waits for the detection of a file system read function call (step S411) or another file system write function call (step S410). If the delete determination indicates (at step S422) that the data is to be deleted from the portable storage device, the data is caused to be deleted from the portable storage device (step S425), and a placeholder is caused to be written to the portable storage device (step S426).

For data which is transmitted to the network repository and not stored on the portable storage device, or locally cached, an easily identifiable placeholder replaces the data in the appropriate location. In one example, a placeholder file with the extension ".mph" (for 'Moka5 PlaceHolder') is placed in the appropriate directory, and each directory is locally cached. If the user inputs a directory listing command, the user views all of the files in the directory, and can distinguish between data which is locally cached on the portable storage device, and data which is stored remotely. The placeholder includes metadata that indicates, for example, where the data is stored, and/or how to retrieve the data.

To increase the virtualized capacity of the storage device, data can be managed using techniques specialized according to the data type, usage pattern, or other factors. For example, song data may simply be replaced by a unique ID placeholder representative of a song. The song data may then be retrieved from over the network when it is accessed via the portable storage device. Furthermore a portable storage device which is also an MP3 player can check to see if the song is locally cached and, if not, the song can be retrieved over the network using the unique ID placeholder. In other implementations, the deletion of data from the portable storage device (step S425) and/or the creation of a placeholder on the portable storage device (step S426) occur earlier and/or later in the method 400, or occur in parallel with other steps.

The network extension code waits for the detection of a file system read function call (step S411). If a file system write function call is detected prior to the detection of a file system read function call, the file system write function call is processed (steps S410 et seq.). If a file system read function call is detected (at step S411), the file system read function call is detected (step S427).

In general, file system read function calls to the storage system made by an application are detected, and the requested data is accessed from the portable storage device or the network repository, based on where the location of the data as determined by the placeholder. If the requested data is on the portable storage device and the data is valid, a shim layer of the network extension code returns this data from the portable storage device. If the requested data is not in the portable storage device and exists on the networked storage, the shim layer receives the data from the network repository, causes the data to be written to the portable storage device, and then presents the data to the application. In more detail, if the data associated with the file system read function call exists on the portable storage device (step S428), the data on the portable storage device is decrypted as necessary (step S436), and access to the data on the portable storage device by the application is effectuated (step S437). If the data associated with the file system read function call is not available from the portable storage device (step S428), the location of the data is determined from the placeholder (step S429).

If a connection to the data is not available (step S430), the user is warned (step S431). In instances where the network repository 103 exists remotely on a network, applications requesting access to data stored on the network repository 103 will not be able to access the data, or the most updated data, if the host computer 102 and the network repository 103 are disconnected. In one implementation, if an application tries to access a file that is not present on the portable storage device, a warning message is generated, where the user determines whether to continue with locally cached data which may not be up-to-date, preempting versions stored on a network repository.

If a connection to the data is available (step S430), space is made on the host computer for the data (step S432). In alternate implementations, such as where sufficient space already exists on the host computer for the data, no space is made on the host computer. In other implementations, making space on the host computer occurs earlier and/or later in the method 400, or occurs in parallel with other steps.

The data stored on the portable storage device is received (step S434), and the placeholder on the portable storage device is deleted (step S435). The data on the portable storage device is decrypted (step S436), and access to the data on the portable storage device by the application is effectuated (step S437). In this regard, although data written to a portable storage device may physically exist on a remote network repository, the data appears to be stored locally on a portable storage device when the application attempts access. In another implementation, such as the case where the data is not encrypted (in step S414), decryption of some or all of the data does not occur, or decryption occurs earlier and/or later in the method 400, or occurs in parallel with other steps.

Accordingly, the portable storage device is seen to be able to contain more data than its own storage capacity when it is plugged into a computer with a network connection. A user can access data that may not be wholly stored on the portable storage device, since the non-locally cached data is automatically retrieved over the network, and transparently presented to the user, as if the data had always resided on the portable storage device.

A determination is made as to whether to terminate the network storage extensions (step S407). The network storage extensions would be terminated, for example, upon decoupling the portable storage device from the host computer, or upon receiving a user selection that network extensions should be terminated. If the network storage extensions are terminated, the method 400 ends (step S405). If the network storage extensions are not terminated, the network extension code waits for the detection of a file system write function call (step S410) or a file system read function call (step S411).

Using the method 400, the user is enabled to access a storage capacity which is greater than that of the portable storage device itself. In a file folder on the portable storage device, the user views directories and files, although some of the files may not be physically stored on the portable storage device. When the user accesses data which is not stored on the portable storage device, the network extension code stored in the portable storage device will fetch the data from the network repository, via the network. In this regard, the portable storage device not only stores data within its own limited capacity, but it also acts as an appliance which allows data to be virtually written to an unbounded storage which is backed up onto a network, and also allows a user to virtually read data on the portable storage device, although the data is actually stored to the network.

Although the method 400 has been described as a synchronous sequence of steps, individual steps may be combined or omitted as necessary, and processing of steps may occur earlier or later in the method 400 than depicted, or may occur in parallel with other steps of the methods 400 to 1100. In particular, the read operation (steps S427 to S437) is predominantly a synchronous operation, such that data is provided in direct and immediate response to a file system read function call. In contrast, the write operation (steps S412 to S426) is predominantly asynchronous, such that data or data modifications are not necessarily transmitted to the network repository immediately, but rather transmissions occur periodically, or as necessary. In an alternate approach, for example, data written to the portable storage device is periodically checked to determine which files have been added or modified, triggering the write operation.

Figure 5:
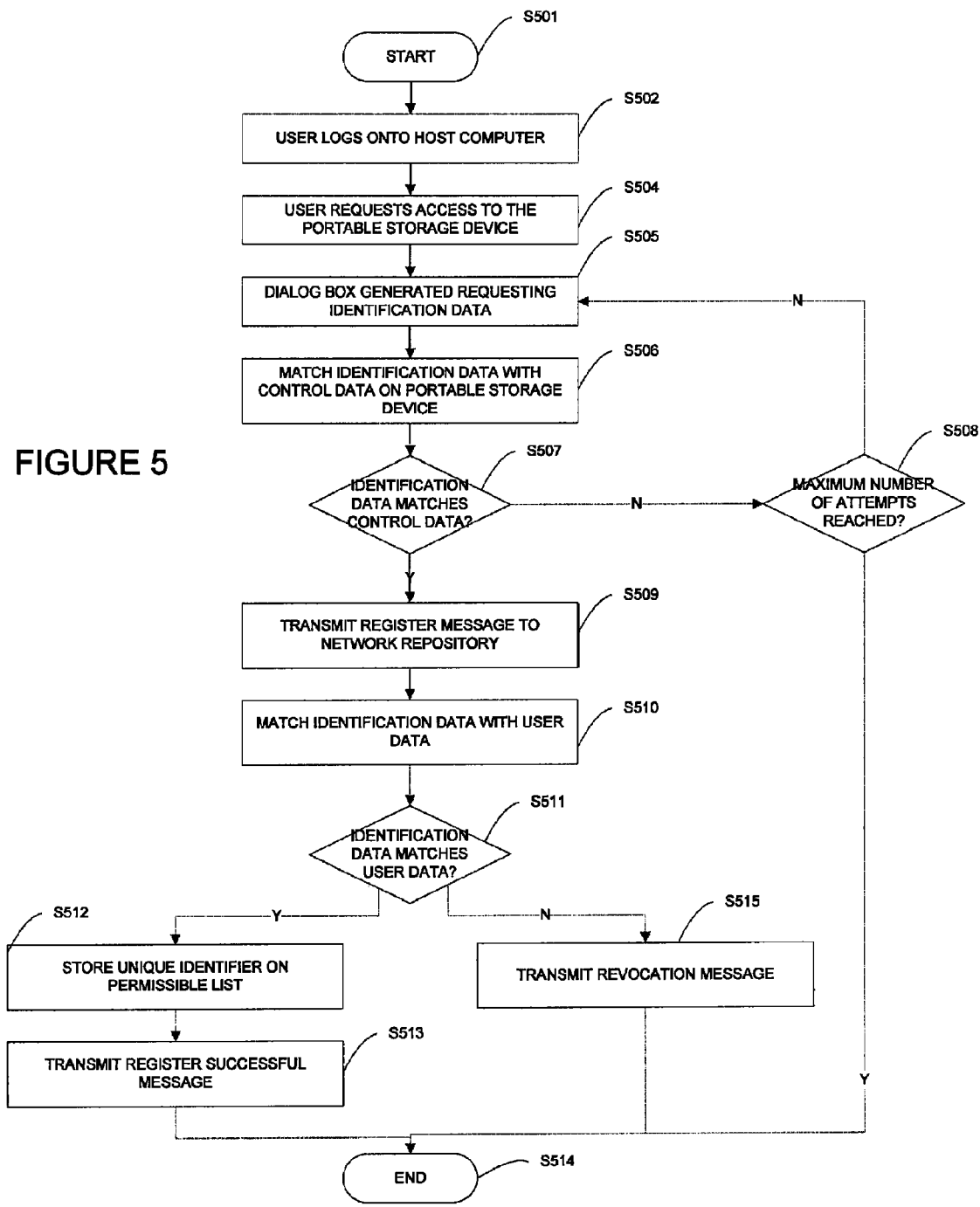
FIG. 5 is a flowchart illustrating a technique for authenticating a user of the host computer, in accordance with one general arrangement.

FIG. 5 is a flowchart illustrating a method 500 for authenticating a user of the host computer, in accordance with one general arrangement. Briefly, authenticating the user further includes receiving a user input, matching the user input with control data stored on the attached storage device, and transmitting a register message to the network repository. If the user input matches the control data, the user input is matched with user data stored on the network repository. An authentication message is received from the network repository if the user input matches the user data, and a revocation message is received from the network repository, if the user input does not match the user data. Although authentication is described herein as using user name and password matching, matching of voice, fingerprint, biometric, or other authentication data may also be used.

In more detail, the method 500 begins (step S501), and the user logs on to the host computer (step S502). When the user requests access to the portable storage device (step S504), such as by attempting a read or write operation onto the portable storage device, an authentication agent (such as authentication agent 231) generates a dialog box or other input interface which requests the input of identification data (step S505). The contents of the portable storage device are not accessible to the user until the user input, which may be user name and password information, matches information stored on the network repository. "Matching" can occur using an exact string match, an algorithmic match, or other type of match. In one implementation, if disconnected operation is enabled, a match of the password with the password used for the last successful network login will also effectuate access to the contents of the portable storage device.

The identification data is matched with control data stored on the portable storage device (step S506). The control data may store a keyed-hash message authentication code ("HMAC") of the last correct password, and checks the identification data against the stored HMAC. If the identification data does not match the control data on the portable storage device (step S507), the dialog box will again request the identification data (step S505 et seq.) if the maximum number of identification attempts has not been reached (step S508). If the maximum number of attempts has been reached, the method 500 will end without the user being authenticated (step S514).

If the identification data matches the control data on the portable storage device (step S507), a register message is transmitted to the network repository (step S509), where the register message includes, for example, the identification data and an identifier which uniquely identifies the portable storage device and/or the host computer. The network repository matches the identification data to stored user data (step S510). Although the user data stored on the portable storage device serves as a 'master' or 'golden' copy of the authorization data, in the case where the network connection to the network repository is unavailable or inoperable, the control data stored on the portable storage device can authorize the user. In an additional implementation, the control data expires after a predetermined period of time, after the control data has correctly authorized a predetermined number of users or sessions, after a predetermined number of incorrect authorization attempts have been made, and/or other criteria. In the case where the identification data stored on the portable storage device has been changed, the control data stored on the portable storage device may be automatically changed as well.

If the identification data matches the user data stored on the portable storage device (at step S511), the unique identifier is stored on the list of permissible portable storage devices and/or host computers (step S512), a register successful message is transmitted from the network repository to the host computer (step S513), and the method 500 ends (step S514). If the identification data does not match the user data stored on the portable storage device (at step S511), a revocation message is transmitted to the host computer (step S515), where the revocation message bars the user from accessing the portable storage device, and the method 500 ends (step S514).

Although the method 500 has been described as a synchronous sequence of steps, individual steps may be combined or omitted as necessary, and processing of steps may occur earlier or later in the method 500 than depicted, or may occur in parallel with other steps of the methods 400 to 1100. For instance, method 500 has been described as an implementation in which the user's identification or password data is first authenticated at the portable storage device (steps S506 to S508), and then subsequently authenticated at the network repository (steps S509 to S515). Although this combined implementation is desirable in the high-security arrangements where, for example, different passwords are used on the portable storage device and the network repository, in another implementation the identification or password data is only authenticated on the portable storage device if a connection to the network repository is not available. In this alternate implementation, a determination would be made (at step S505) whether connection to the network repository existed and, if so, local authentication (steps S506 to S508) would be omitted in favor of network authentication (steps S509 to S515). If no connection to the network repository existed, then local authentication (steps S506 to S508) would proceed as described, and network authentication (steps S509 to S515) would be omitted. As described above, data stored on the portable storage device can be accessed if no network connection exists, as long as the user is locally authenticated (steps S506 to S508).

Figure 6:
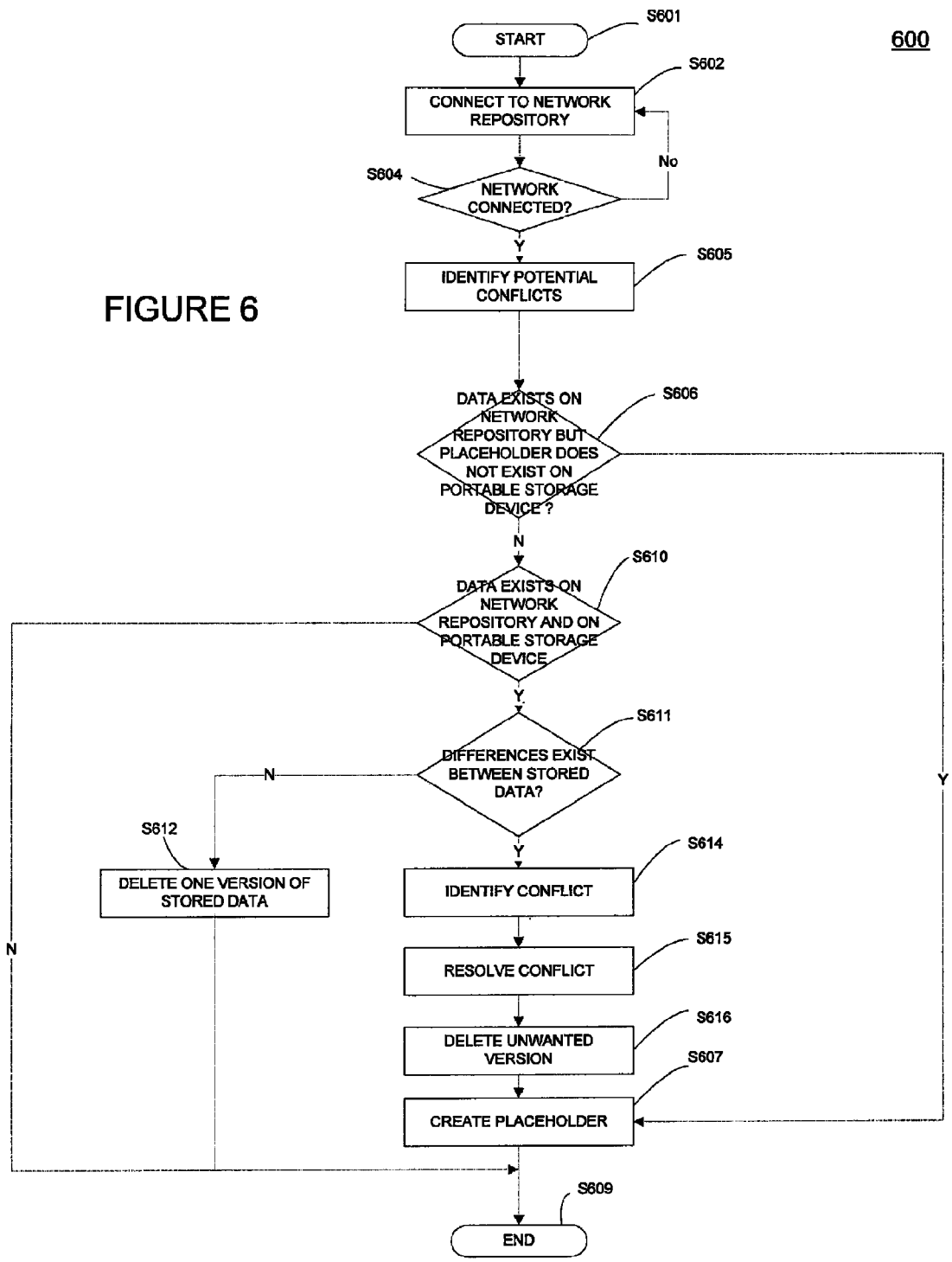
FIG. 6 is a flowchart illustrating a technique for synchronizing data between the portable storage device and the network repository, in accordance with one general arrangement.

FIG. 6 is a flowchart illustrating a method 600 for synchronizing data between the portable storage device and the network repository, in accordance with one general arrangement. Briefly, synchronization data is useful where data modification occurs on different portable storage devices, such that the currently-used portable storage device may not have the latest copy of the data. The currently-used portable storage device can be brought up to date by fetching all the newly written data, or data which has been changed on the host computer but not on the network repository. In the event that data has been changed on both the network repository and the portable storage device, the user is informed and asked to decide which version of the data to keep.

In more detail, when the method 600 begins (step S601), a connection to the network repository is established (step S602). If a connection is currently unavailable (step S604), an attempt at connection is made (step S602) until the connection to the network repository is established (step S602).

Potential conflicts are identified (step S605). A conflict would exist where data resides on the network repository but no placeholder exists on the portable storage device, or where data exists on both the network repository and the portable storage device. If the data is available on the network repository, but a placeholder is not available from the portable storage device (step S606), the placeholder is created (step S607), and the method 600 ends (step S609). If (at step S606) the data is available on the network repository, or a placeholder is available on the portable storage device, it is determined whether the data exists on the network repository and the portable storage device (step S610). If the data is not available from both the network repository and on the portable storage device, the method 600 ends (step S609).

If the data exists on the network repository and on the portable storage device, it is determine whether differences exist between the stored data (step S611). If no differences exist between the data, one version of the data is deleted (step S612), and the method 600 ends (step S609). Since the two versions of data are the same, the version which is deleted may be user selected, be arbitrary, or may depend upon system performance.

If differences exist between the stored data (at step S611), the conflict is identified (step S614) and resolved (step S615). The conflict may be identified by the synchronization agent displaying a window on a graphical user interface which alerts a user to the conflict, where the conflict is resolved by asking the user which version of the data to delete. Alternatively, conflict resolution can be automated using data heuristics, or by automatically deleting an older version, a smaller data file. The unwanted version of the data is deleted (step S616).

If the data has been deleted from the portable storage device (in step S616), a placeholder is created on the portable storage device (step S607), and the method 600 ends (step S609). Although the method 600 has been described as a synchronous sequence of steps, individual steps may be combined or omitted as necessary, and processing of steps may occur earlier or later in the method 600 than depicted, or may occur in parallel with other steps of the methods 400 to 1100.

Figure 7:
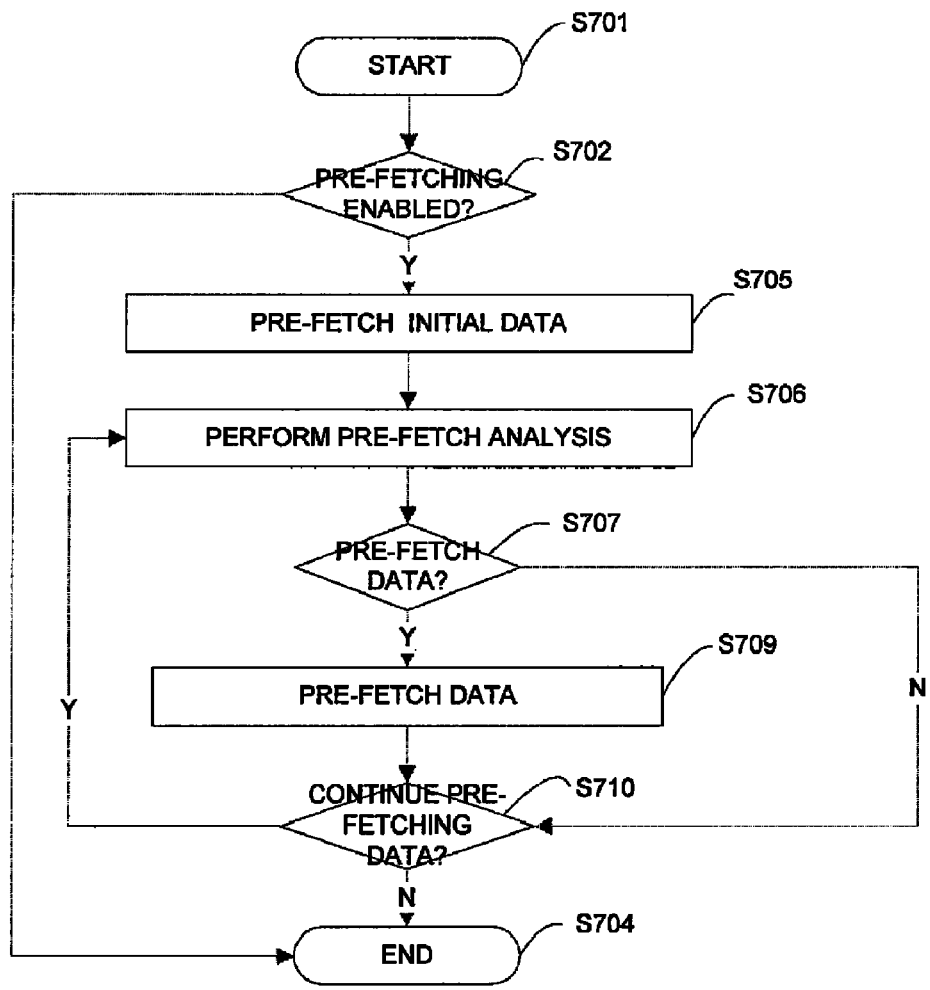
FIG. 7 is a flowchart illustrating a technique for pre-fetching data from the network repository to the portable storage device, in accordance with one general arrangement.

FIG. 7 is a flowchart illustrating a method 700 for pre-fetching data from the network repository to the portable storage device, in accordance with one general implementation. In more detail, when the method 700 begins (step S701), it is determined whether pre-fetching is enabled (step S702). Pre-fetching may be automatically or manually enabled or disabled, depending upon a user preference, system performance, or other reasons. If pre-fetching is not enabled (at step S702), the method 700 ends (step S704). If pre-fetching is enabled, initial data is pre-fetched (step S705). In an alternate implementation, initial data is not pre-fetched.

A pre-fetch analysis is performed (step S706). The pre-fetch analysis is, for example, an analysis of the data being accessed, or upon a pattern of accesses, in order to correlate an access order. If it is determined that a first data block is likely to be succeeded by a second data block, then the pre-fetch analysis will determine that the second data block is to be pre-fetched upon determining that the first data block has been accessed, even if a file system read function call has not yet requested read access to the second data block. If, as a result of the pre-fetch analysis, data is not to be pre-fetched (step S707), it is determined whether to continue pre-fetching data (step S710). If data is to be pre-fetched (step S707), data is pre-fetched (step S709).

It is determined whether to continue pre-fetching data (step S710). If it is determined to not continue pre-fetching data (at step S710), the method 700 ends (step S704). If it is determined to continue pre-fetching data (at step S710), a pre-fetch analysis is again performed (step S706 et seq.). Although the method 700 has been described as a synchronous sequence of steps, individual steps may be combined or omitted as necessary, and processing of steps may occur earlier or later in the method 700 than depicted, or may occur in parallel with other steps of the methods 400 to 1100.

Figure 8:
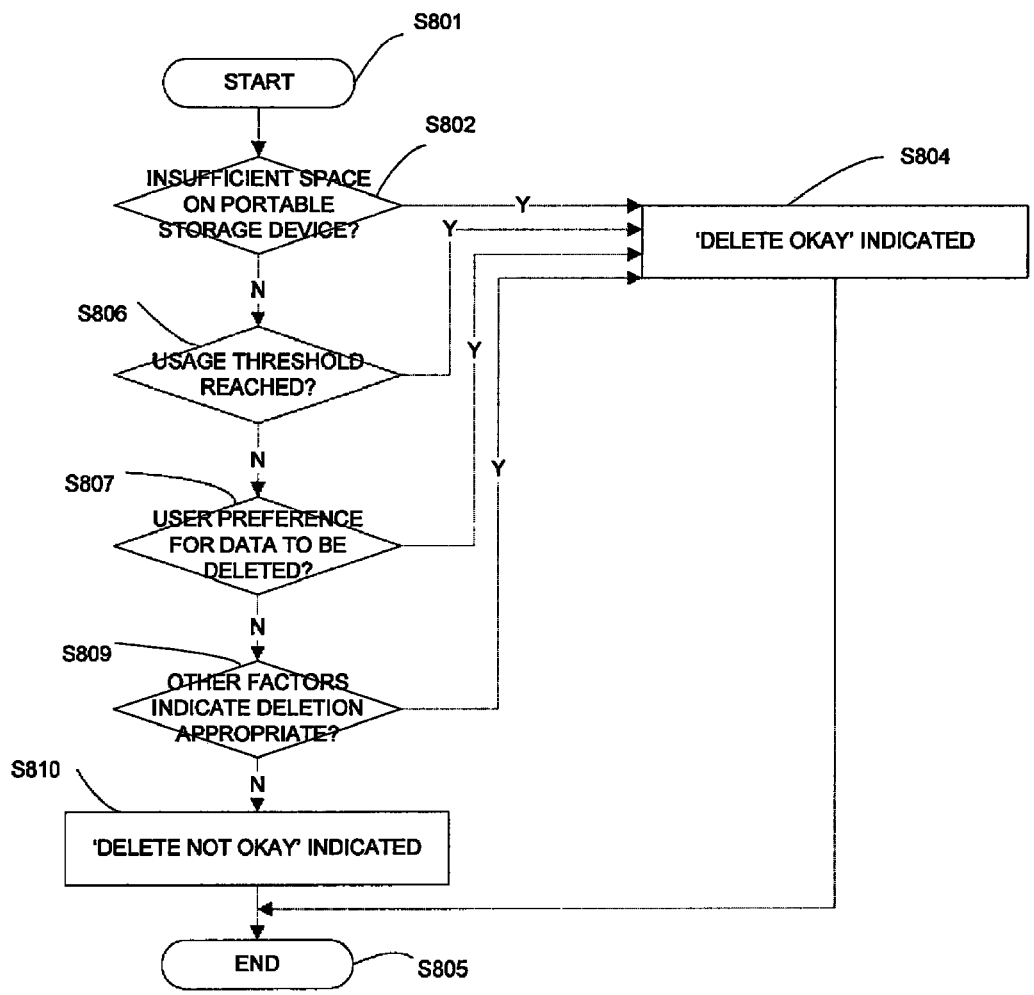
FIG. 8 is a flowchart illustrating a technique for generating a delete determination indicative of whether to delete data from the portable storage device, in accordance with one general arrangement.

FIG. 8 is a flowchart illustrating a method 800 for generating a delete determination indicative of whether to delete data from the portable storage device, in accordance with one general arrangement. It would be appropriate to delete data from the portable storage device, for example, to free up space on the portable storage device, knowing that the data is backed-up onto the network repository.

In more detail, when the method 800 begins (step S801), it is determined whether insufficient space exists on the portable storage device (step S802). If insufficient space exists on the portable storage device, a 'delete okay' signal is generated, indicating that it is acceptable to delete the data from the portable storage device (step S804), and the method 800 ends (step S805).

The determination of sufficiency of the space which exists on the portable storage device is a manual or automatic determination, which is based upon factors such as user preference, file size, desired system performance, storage medium capacity, or other factors. If sufficient space exists on the portable storage device (at step S802), it is determined whether a usage threshold has been reached (step S806). If the usage threshold has been reached, the 'delete okay' signal is generated (step S804 et seq.). The usage threshold is also determined based upon personal or business factors, such as disk quota, a bandwidth quota, a maximum file size, date and time information that the data is accessible, a charge rate if the user is paying for storage, or other information related to data access.

If the usage threshold has not been reached (at step S806), it is determined whether a user preference exists for the deletion of data from the portable storage device (step S807). If a user preference exists that data should be deleted (at step S807), the 'delete okay' signal is generated (step S804 et seq.). If no user preference exists that data should be deleted, or if the user preference exists that the data should not be deleted (at step S807), other factors which indicate that deletion is appropriate are checked (step S809).

If other factors exist which indicate that the data should be deleted (at step S809), the 'delete okay' signal is generated (step S804 et seq.). If other factors indicate that the data should not be deleted (at step S809), a 'delete not okay' signal is generated, indicating that it is not acceptable to delete the data from the portable storage device (step S810), and the method 800 ends (step S805).

Although the method 800 has been described as a synchronous sequence of steps, individual steps may be combined or omitted as necessary, and processing of steps may occur earlier or later in the method 800 than depicted, or may occur in parallel with other steps of the methods 400 to 1100. Furthermore, although the method 800 describes four tests for determining whether it is appropriate to delete the data from the portable storage device, fewer tests or more tests could be used, as appropriate, such as the case where the user preference for deletion is dispositive, or where the determination is based upon a mathematical algorithm.

Figure 9:
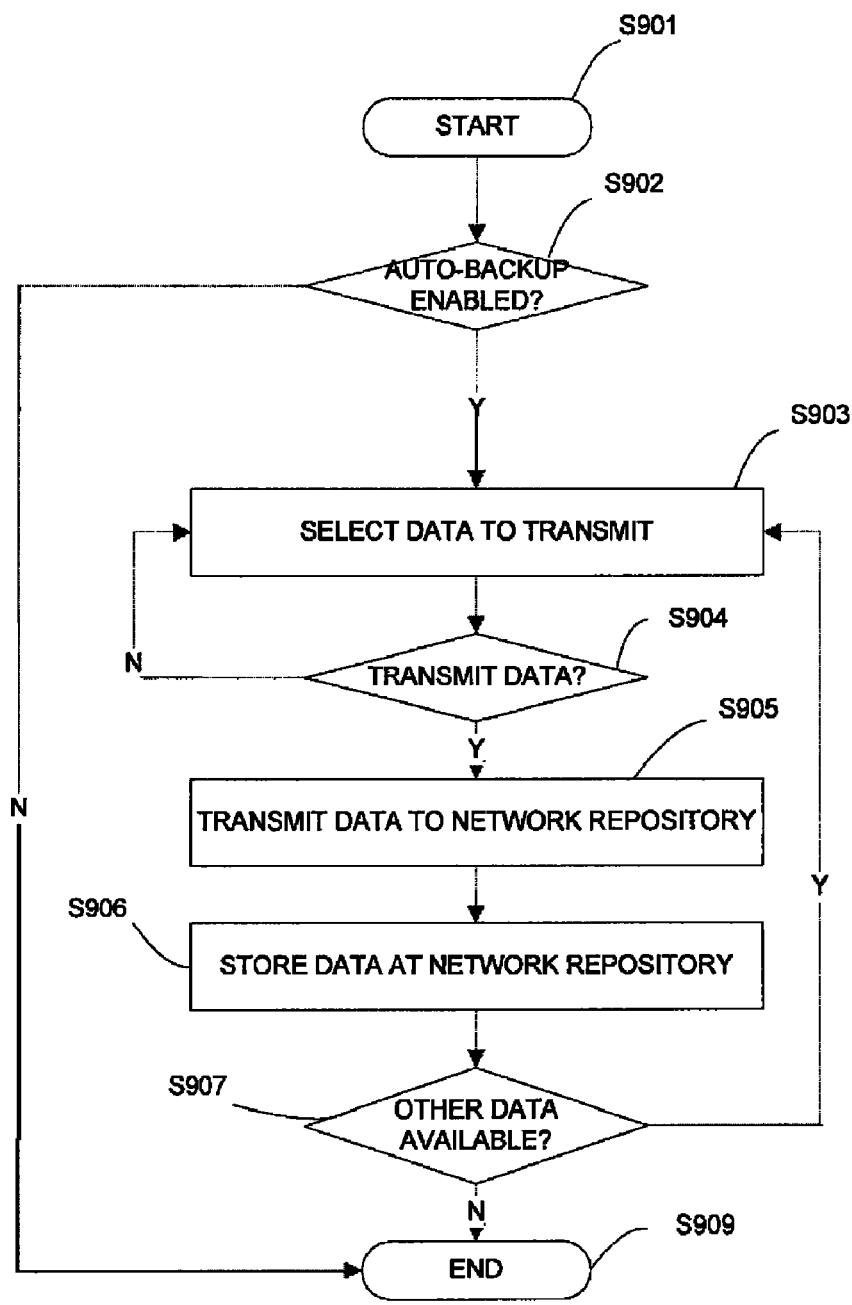
FIG. 9 is a flowchart illustrating a technique for automatically backing-up data written to a portable storage device, in accordance with one general arrangement.

FIG. 9 is a flowchart illustrating a method 900 for automatically backing-up data written to a portable storage device, in accordance with one general arrangement. The automatic backup feature automatically backs up at least a portion of the data stored on the portable storage device, such as all modified data, to the network repository. In this regard, the data which is backed up is always available, even if the portable storage device is lost, stolen, or damaged. Once transmitted to the network repository, the data is not necessarily deleted from the portable storage device. Furthermore, method 900 supports check-pointing and versioning, providing data backups with a version or data backup history, so a particular version of the data can later be rolled-back or restored.

In more detail, when the method 900 begins (step S901), it is determined whether auto-backup is enabled (step S902). If auto-backup is not enabled, the method 900 ends (step S909). If auto-backup is enabled, data is selected to be transmitted to a network repository (step S903).

If the data is not to be transmitted (at step S904), other data to transmit is selected (step S902 et seq.). If the data is to be transmitted (at step S904), the data is transmitted to the network repository (step S905), and is stored at the network repository (step S906). The data may also be scheduled for transmission, so that data is backed-up during periods of low network usage. If no other data is available to back-up (at step S907), the method 900 ends (step S909). If other data is available to back-up (at step S907), the other data is selected to transmit (step S902 et seq.). Although the method 900 has been described as a synchronous sequence of steps, individual steps may be combined or omitted as necessary, and processing of steps may occur earlier or later in the method 900 than depicted, or may occur in parallel with other steps of the methods 400 to 1100.

Figure 10:
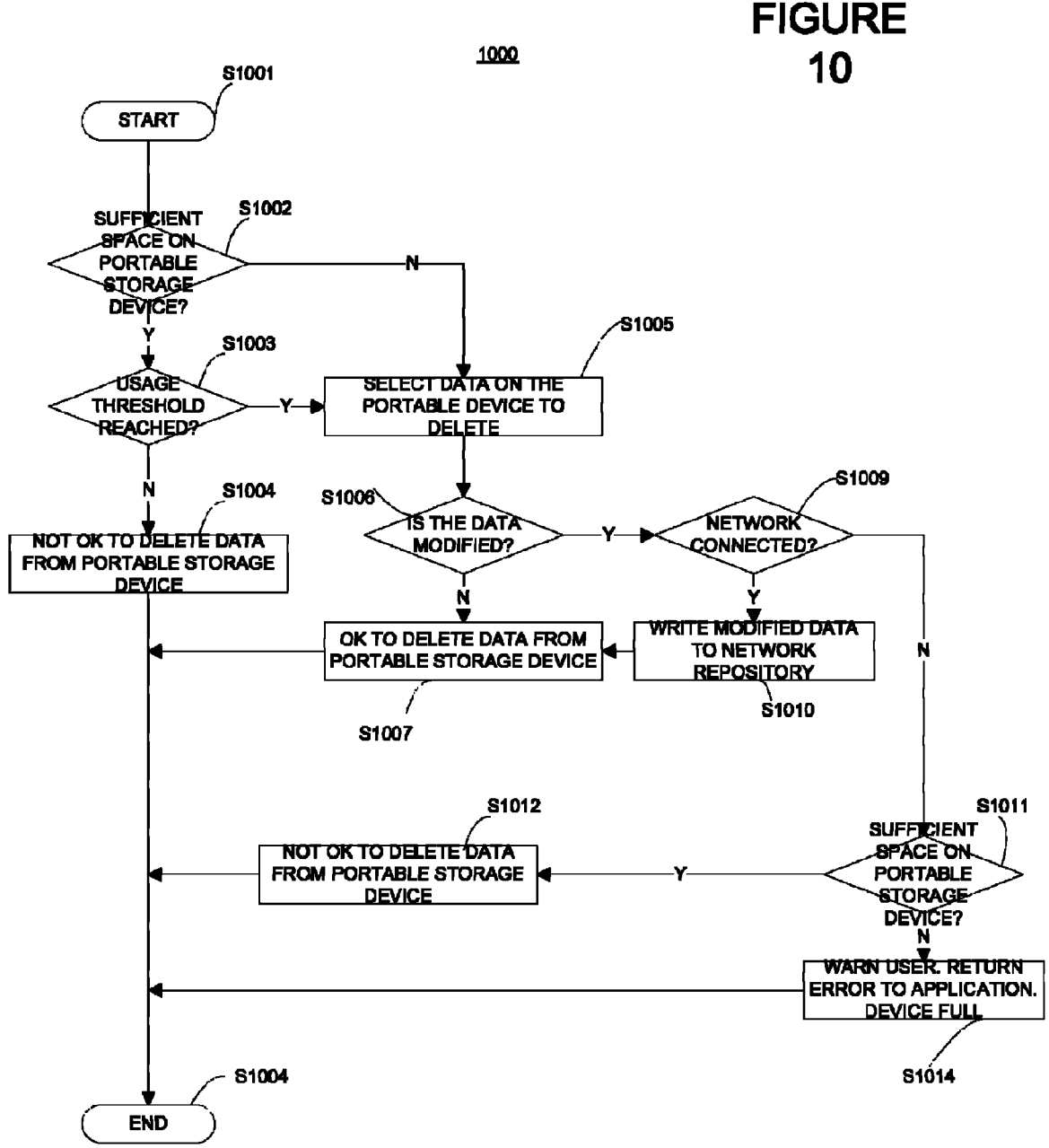
FIG. 10 is a flowchart illustrating a technique for generating a delete determination indicative of whether to delete data from the portable storage device, in accordance with another general arrangement.

FIG. 10 is a flowchart illustrating a method 1000 for generating a delete determination indicative of whether to delete data from the portable storage device, in accordance with another general arrangement. In more detail, when the method 1000 begins (step S1001), it is determined whether sufficient space exists on the portable storage device (step S1002). If sufficient space exists on the portable storage device (step S1002), it is determined whether a usage threshold has been reached (step S1003). If the usage threshold has not been reached, then a 'delete not okay' signal is indicated, the 'delete not okay' signal indicating that the data on the portable storage device should not be deleted. If insufficient space exists on the portable storage device (at step S1002), or if the usage threshold has been reached (at step S1003), data is selected on the portable storage device to delete (step S1005).

If the selected data has not been modified (step S1006), a 'delete okay' signal is indicated (step S1007), the 'delete okay' signal indicating that the selected data on the portable storage device should be deleted. If the selected data has been modified (step S1006), it is determined whether the host computer is connected to the network repository (step S1009). If the data has been modified and the host computer is connected to the network repository, the modified data is written to the network repository (step S 1010), and the 'delete okay' signal is indicated (step S1007).

If the data has been modified, and the host computer is not connected to the network repository (at step S1009), a determination is made as to whether there is sufficient space on the portable storage device (step S1011). If sufficient space exists, the 'delete not okay' signal is indicated (step S1012), and the method 1000 ends (step S1004).

If insufficient space exists on the portable storage device, the user is warned, and an error is returned indicating that the portable storage device is full (step S1014), and the method 1000 ends (step S1004). The error will prematurely effectuate the termination of the network storage extensions (FIG. 4, step S407). Although the method 1000 has been described as a synchronous sequence of steps, individual steps may be combined or omitted as necessary, and processing of steps may occur earlier or later in the method 1000 than depicted, or may occur in parallel with other steps of the methods 400 to 1100.

Figure 11:
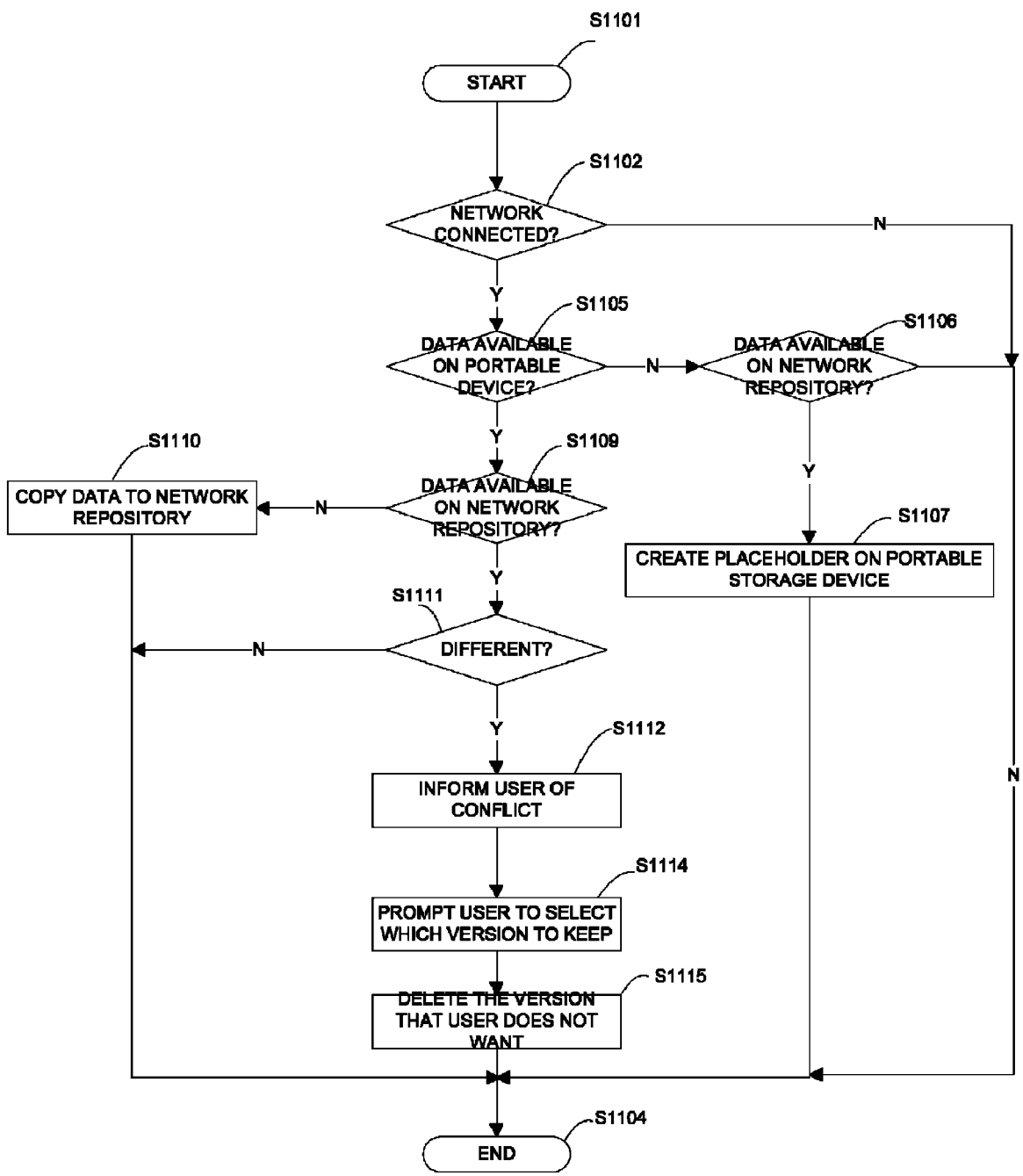
FIG. 11 is a flowchart illustrating a technique for synchronizing data between the portable storage device and the network repository, in accordance with another general arrangement.

FIG. 11 is a flowchart illustrating a method 1100 for synchronizing data between the portable storage device and the network repository, in accordance with another general arrangement. In more detail, when the method 1100 begins (step S1101), it is determined whether a connection to the network repository exists (step S1102). If a connection is currently unavailable, the method 1100 ends (step S1104).

If the data exists on the portable storage device (step S1105), it is determined whether the data also exists on the network repository (step S1106). If the data is not available from the portable storage device and also is not available from the network repository, the method 1100 ends (step S1104). If the data is not available from the portable storage device but it is available on the network repository, a placeholder is created on the portable storage device (step S1107), and the method 1100 ends (step S1104).

If the data exists on the portable storage device but not on the network repository (step S1109), the data is copied to the network repository (step S1110), and the method 1100 ends (step S1104). If the data exists on the portable storage device and also on the network repository, it is determined whether the data is different (step S1111). If the data is not different, the method 1100 ends (step S1104). If the data is different, the user is informed of the conflict (step S1112).

Once informed of the conflict, the user is prompted to select which version to keep (step S1114), the version which the user does not want to keep is deleted (step S1115), and the method 1100 ends (step S1104). Although the method 1100 has been described as a synchronous sequence of steps, individual steps may be combined or omitted as necessary, and processing of steps may occur earlier or later in the method 1100 than depicted, or may occur in parallel with other steps of the methods 400 to 1100.

Figure 12:
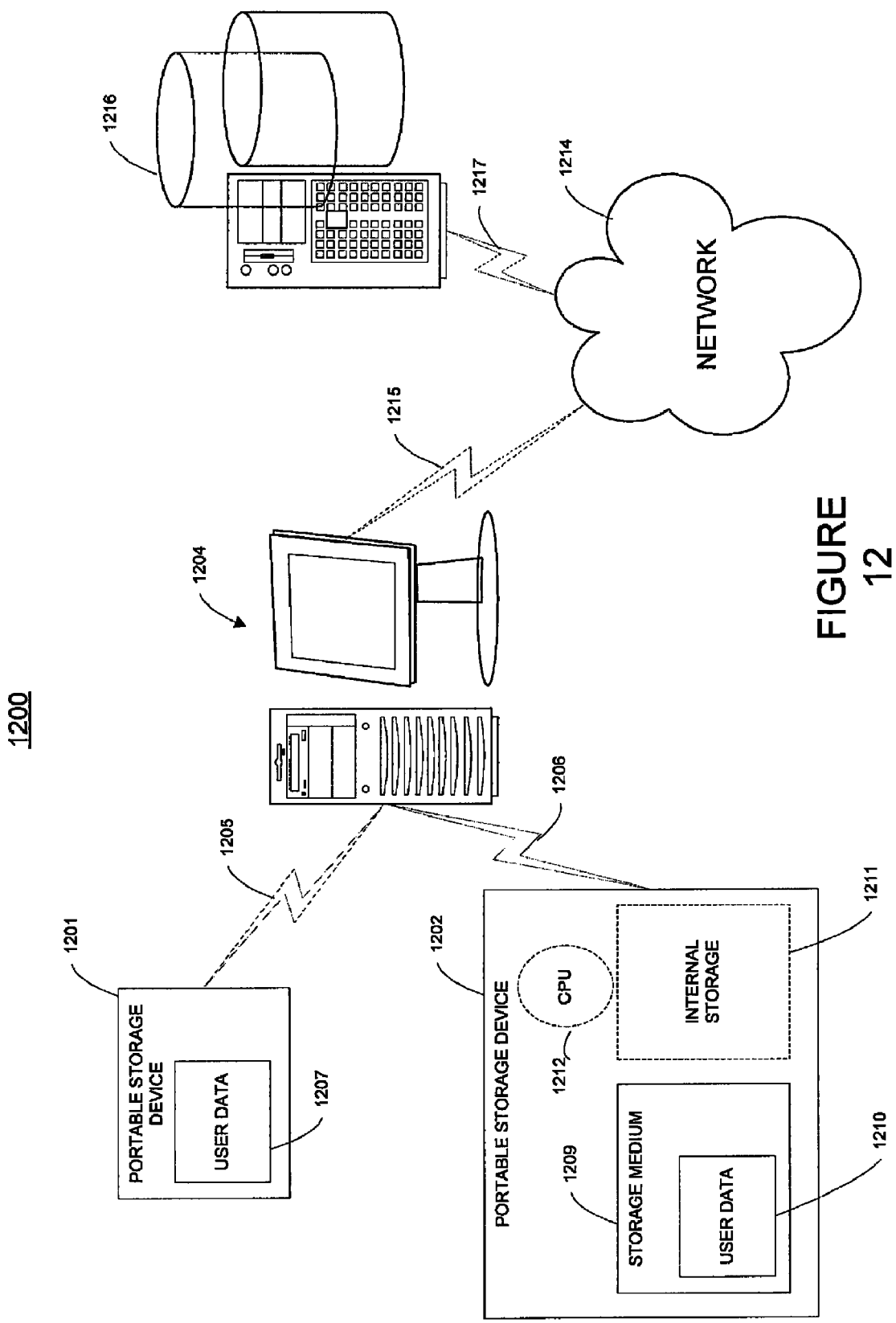
FIG. 12 depicts the exterior appearance of another example system, including a portable storage device coupled to a host computer.

FIG. 12 depicts the exterior appearance of example system 1200, including portable storage devices 1201 and 1202 coupled to a host computer 1204 via a wireless couplings 1205 and 1206, respectively. The portable storage device 1201, the more modest configuration of the two portable storage devices, merely includes a storage medium which stores user data 1207. The portable storage device 1202, the more robust configuration of the two portable storage devices, includes a storage medium 1209 which stores user data 1210, as well as an internal storage 1211 and a CPU 1212. The host computer 1204 is connected to a network 1214 via a wired or wireless network connection 1215, and a network repository 1216 is connected to the network 1214 via a wired or wireless network connection 1217.

Figure 13:
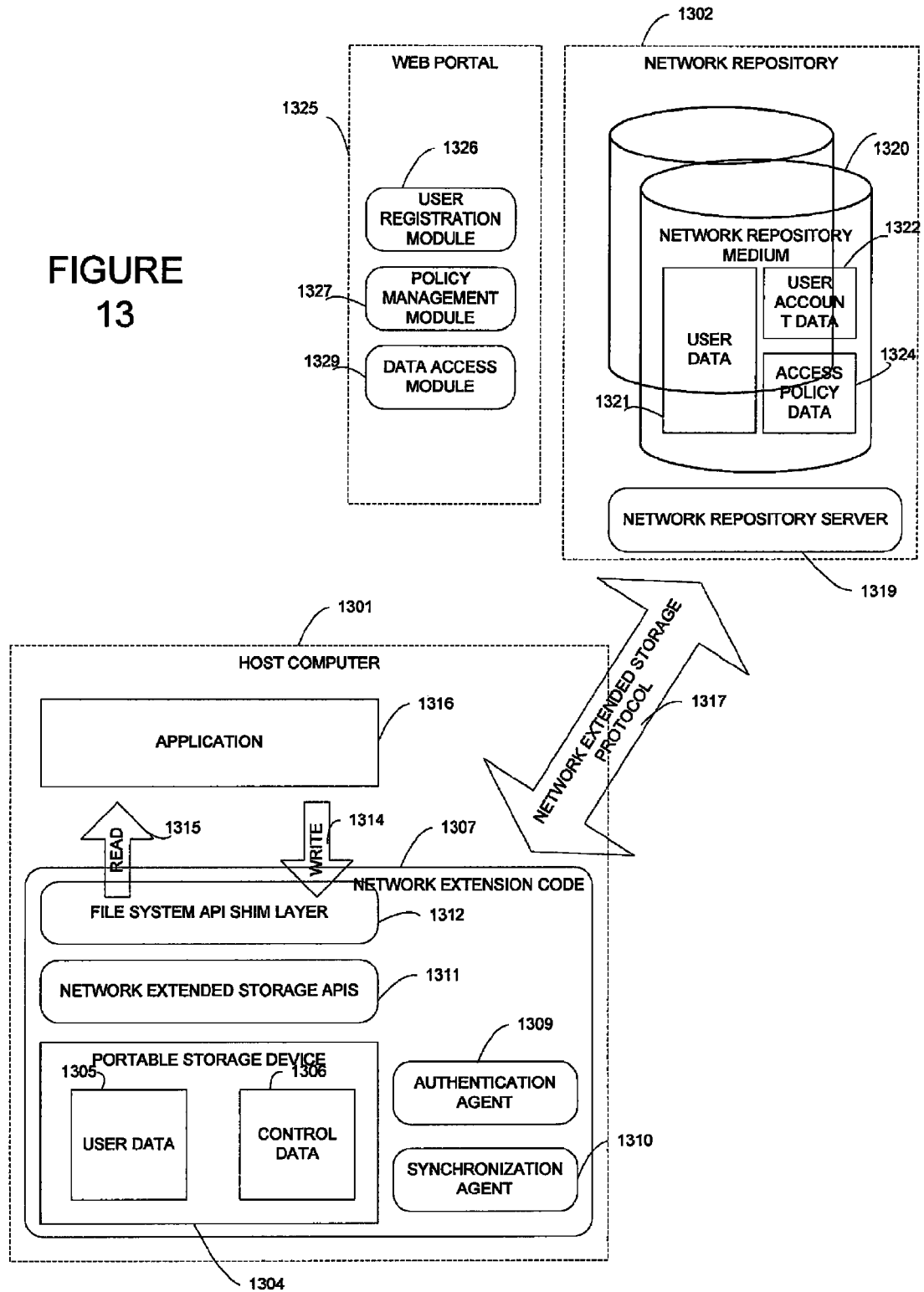
FIG. 13 is a block diagram depicting the flow of data between internal software and hardware components on the host computer and the network repository.

FIG. 13 is a block diagram depicting the flow of data between internal software and hardware components on a host computer 1301 and a network repository 1302. A portable storage device 1304 is coupled to the host computer 1301, where the portable storage device 1304 stores user data 1305 and control data 1306. Network extension code 1307 is invoked on the host computer, enables user access to data stored on the network repository 1302.

The network extension code 1307, which is executed by the host computer 1301, includes an authentication agent 1309 and a synchronization agent 1310, as well as network extended storage APIs 1311, storing routines and protocols used by the network extension code 1307, and a file system API shim layer 1312, which detects a file system write function call 1314 and a file system read function call 1315 from an application 1316 executed on the host computer 1301. The host computer 1301 communicates with the network repository 1302 via a network extended storage protocol 1317, which enables the network repository server 1319 and the network extension code 1307 to communicate.

The network repository 1302 further includes a network repository server 1319 which receives data and other signals transmitted from the host computer 1301 to the network repository 1302. The network repository 1302 and the network repository server 1319 provide the main data storage. Once received, data is stored in a network repository storage medium 1320. The network repository storage medium 1320 stores user data 1321, user account data 1322, and access policy data 1324. Since the storage capacity of the network repository storage medium 1320 is much larger than that of the portable storage device 1304, and since data is moved transparently from the portable storage device 1304 to the network repository storage medium 1320, the network extension code 1307 effectuates limitless storage of data which is ostensibly written to the portable storage device 1304.

In addition to user data 1321, the network repository 1302 also contains user account data 1322 and access policy data 1324 for each individual user served by the network repository 1302. The user account data 1322 includes, for example, a username and password, e-mail or other correspondence address, user preferences, billing information such as credit card numbers for charging the user for storage, sharing information for allowing the user to share data with other users, and identification information of the associated host computers or network-extended storage clients, or other information relating to the user. The access policy data 1324 includes, for example, a disk quota, a bandwidth quota, a maximum file size, date and time information that the data is accessible, a charge rate if the user is paying for storage, and other information related to data access.

The web portal 1325 provides a front-end interface for accessing user data stored in the network repository 1302, and for setting up and managing the network repository 1302. The web portal 1325 allows users to sign up for accounts and to change their user preferences, which are stored, for example, in the user account data 1322. Additionally, the web portal 1325 allows the system administrator to create and modify access policy, which is stored, for example, in the access policy data 1324. The web portal 1325 further includes a user registration module 1326, a policy management module 1327, and a data access module 1329. Using the web portal 1325, a user can easily access data stored in the network repository 1302, such as via a web browser. In an alternate implementation, it is also possible to have the user access the data without going through the web portal, such as where the user buys a new portable storage device and couples the device to the host computer. If the new portable storage device has no account association, the network extension code may ask the user if they want to sign up to access the data.

Another general implementation is directed to a portable storage device including a storage medium storing network extension code, where, when the portable storage device is coupled to a host computer, the network extension code is invoked. The network extension code is operable to detect a file system write function call generated by an application executing on the host computer, the file system write function call operable to cause the data to be written to the portable storage device, and cause the data to be written to the portable storage device based upon the file system write function call. The network extension code is further operable to generate a transmit determination indicative of whether to transmit the data to a network repository, and transmit the data to the network repository based upon the transmit determination.

Using a network-extended portable storage device, unbounded storage capacity is provided on a portable storage device, since the storage capacity is merely limited by the storage capacity of multiple network-connected storage servers which make up the network repository. Additionally, data stored on the network repository is secured in a safe data center environment, free from the myriad data-integrity issues which plague portable storage devices. Furthermore, data is recoverable in case the portable storage device is lost, since the data can still be retrieved from the network repository. In this regard, since network-extended storage is ostensibly presented to the applications running on a host computer as a normal portable storage device, there is no need to change applications to adopt this approach, and no external synchronization, copying, or backup needs to be performed to present the network-extended storage to the user or the host computer as a single storage medium.

A further general implementation is directed to a computer program product tangibly stored on a portable storage device including a computer-readable medium, includes instructions to be performed by a host computer when the portable storage device is coupled to the host computer. The instructions are operable to cause a host computer to invoke network extension code stored on the portable storage device, where the network extension code is operable to detect a file system write function call generated by an application executing on the host computer, the file system write function call operable to cause data to be written to the portable storage device, and to cause the data to be written to the portable storage device based upon the file system write function call. The network extension code is further operable to generate a transmit determination indicative of whether to transmit the data to a network repository, and to transmit the data to the network repository based upon determining whether to transmit the data to the network repository.

According to another general implementation, a system includes a network repository, a portable storage device, and a host computer. The portable storage device further includes a storage medium storing network extension code. The network extension code is operable to detect a file system write function call generated by an application, the file system write function call operable to cause data to be written to the portable storage device, cause the data to be written to the portable storage device based upon the file system write function call, generate a transmit determination indicative of whether to transmit the data to a network repository, and transmit the data to the network repository based upon the transmit determination. The host computer is operable to execute the application, and invoke the network extension code when the portable storage device is coupled to the host computer.

It is understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components.

The arrangements have been described with particular illustrative embodiments. It is to be understood that the concepts and implementations are not however limited to the above-described embodiments and that various changes and modifications may be made.

What is claimed is:

1. A computer-implemented method comprising:
coupling a portable storage device to a host computer; and
invoking network extension code stored on the portable storage device, the network extension code allowing an application executing on the host computer to write data to the portable storage device without being limited by a physical storage capacity of the portable storage device, the network extension code being operable to:
detect a file system write function call generated by the application, the file system write function call operable to cause the data to be written to the portable storage device,
cause the data to be written to the portable storage device based upon the file system write function call,
generate a transmit determination indicative of whether to transmit at least a portion of the written data to a network repository based on an available storage capacity of the network repository, and
transmit the at least portion of the written data to the network repository based upon the transmit determination.

2. The computer-implemented method according to claim 1, further comprising installing at least a portion of the network extension code onto the host computer.

3. The computer-implemented method according to claim 1, wherein the transmit determination is based upon one or more of elapsed time, a data type, usage heuristics, available storage space, data modification time, existence of a connection between the host computer and the portable storage device, existence of a connection between the host computer and the network repository, or a user selection.

4. The computer-implemented method according to claim 1, wherein the network extension code is further operable to:
generate a delete determination indicative of whether to delete the data from the portable storage device, and
cause the data to be deleted from the portable storage device based upon the delete determination.

5. The computer-implemented method according to claim 4, wherein the network extension code is further operable to cause a placeholder to be written to the portable storage device, the placeholder indicative of a location of the data.

6. The computer-implemented method according to claim 1, wherein the network extension code is further operable to encrypt or decrypt the data.

7. The computer-implemented method according to claim 1, wherein the network extension code is further operable to:
detect a file system read function call made by the application, the file system read function call operable to read the data on the portable storage device, and
effectuate reading the data from the portable storage device to the application.

8. The computer-implemented method according to claim 1, wherein the network extension code is further operable to:
receive the data from the network repository, and
store the data on the portable storage device.

9. The computer-implemented method according to claim 5, wherein the network extension code is further operable to:
locate the data based upon the placeholder; and
delete the placeholder.

10. The computer-implemented method according to claim 8, wherein the data is received from the network repository if the data is not available from the portable storage device or if a placeholder indicative of a location of the data is available on the portable storage device.

11. The computer-implemented method according to claim 8, wherein the data is received from the network repository if the data on the network repository is more up-to-date than the data on the portable storage device.

12. The computer-implemented method according to claim 8, wherein the network extension code is further operable to pre-fetch the data from the network repository.

13. The computer-implemented method according to claim 1, wherein the network extension code is further operable to authenticate a user.

14. The computer-implemented method according to claim 13, wherein authenticating the user further comprises:
receiving a user input;
matching the user input with first control data stored on the portable storage device;
transmitting a first message to the network repository, if the user input matches the control data;
matching the user input with second control data stored on the network repository;
receiving an authentication message from the network repository, if the user input matches the second control data; and
receiving a revocation message from the network repository, if the user input does not match the second control data.

15. The computer-implemented method according to claim 14, wherein the user input is password, voice, fingerprint, or biometric data.

16. The computer-implemented method according to claim 1, wherein the data represents a portion of a computer file, or an entire computer file.

17. The computer-implemented method according to claim 2, further comprising uninstalling the at least the portion of the network extension code installed onto the host computer.

18. The computer-implemented method according to claim 1, wherein the network extension code is further operable to synchronize the data on the portable storage device with the data on the network repository.

19. The computer-implemented method according to claim 1, wherein the portable storage device is a media player, a telephone, a hand-held game system, a navigation system, a smart card, a flash memory, a universal serial bus ("USB") memory stick, or an external hard disk drive.

20. The computer-implemented method according to claim 1, wherein the network extension code is operable to recognize the file system write function call at a block level.

21. The computer-implemented method according to claim 1, wherein the network extension code is operable to recognize the file system write function call at a file level.

22. The computer-implemented method according to claim 1, wherein the network extension code is operable to recognize the file system write function call via a host-specific file system driver.

23. The computer-implemented method according to claim 1, wherein the network extension code is operable to recognize the file system write function call via a user-space dynamic link library ("DLL").

24. A portable storage device comprising a storage medium storing network extension code, the network extension code allowing an application executing on a host computer to write data to the portable storage device without being limited by a physical storage capacity of the portable storage device, wherein, when the portable storage device is coupled to a host computer, the network extension code is invoked, the network extension code operable to:
- detect a file system write function call generated by the application, the file system write function call operable to cause the data to be written to the portable storage device,
- cause the data to be written to the portable storage device based upon the file system write function call,
- generate a transmit determination indicative of whether to transmit at least a portion of the written data to a network repository based on an available storage capacity of the network repository, and
- transmit the at least a portion of the written data to the network repository based upon the transmit determination.

25. A computer program product, tangibly stored on a portable storage device including a computer-readable medium, the computer program product comprising instructions to be performed by a host computer when the portable storage device is coupled to the host computer, the instructions operable to cause the host computer to invoke network extension code stored on the portable storage device, the network extension code allowing an application executing on the host computer to write data to the portable storage device without being limited by a physical storage capacity of the portable storage device, wherein, when the portable storage device is coupled to the host computer, the network extension code is invoked, the network extension code operable to:
- detect a file system write function call generated by the application, the file system write function call operable to cause the data to be written to the portable storage device,
- cause the data to be written to the portable storage device based upon the file system write function call,
- generate a transmit determination indicative of whether to transmit at least a portion of the written data to a network repository based on an available storage capacity of the network repository, and
- transmit the at least a portion of the written data to the network repository based upon determining whether to transmit the data to the network repository.

26. A system comprising:
- a network repository;
- a portable storage device further comprising a storage medium storing network extension code, the network extension code operable to:
- detect a file system write function call generated by an application, the file system write function call operable to cause the data to be written to the portable storage device,
- cause the data to be written to the portable storage device based upon the file system write function call,
- generate a transmit determination indicative of whether to transmit at least a portion of the written data to a network repository based on an available storage capacity of the network repository, and
- transmit the at least a portion of the written data to the network repository based upon the transmit determination; and
- a host computer operable to:
- execute the application, and
- invoke the network extension code when the portable storage device is coupled to the host computer, the network extension code allowing the application executing on the host computer to write data to the portable storage device without being limited by a physical storage capacity of the portable storage device.

* * * * *